United States Patent [19]

Crow et al.

[11] 4,328,548
[45] May 4, 1982

[54] LOCATOR FOR SOURCE OF ELECTROMAGNETIC RADIATION HAVING UNKNOWN STRUCTURE OR ORIENTATION

[75] Inventors: William M. Crow, Fanwood, N.J.; Michael J. Yerbury, St. Ives, Australia

[73] Assignee: The Austin Company, Cleveland, Ohio

[21] Appl. No.: 137,287

[22] Filed: Apr. 4, 1980

[51] Int. Cl.³ .............................................. G01S 3/02
[52] U.S. Cl. .................................. 364/449; 364/460; 343/112 R; 343/112 D; 343/113 R
[58] Field of Search ................... 364/460, 449, 561; 343/100 CS, 112 D, 113, 112 R; 324/244, 330

[56] References Cited

U.S. PATENT DOCUMENTS

| | | | |
|---|---|---|---|
| 2,432,858 | 12/1947 | Brown | 250/11 |
| 2,623,924 | 12/1952 | Cartier et al. | 324/330 |
| 3,103,663 | 9/1963 | Parker | 343/108 |
| 3,121,228 | 2/1964 | Kalmus | 343/112 D X |
| 3,133,283 | 5/1964 | Ghose | 343/100 |
| 3,354,459 | 11/1967 | Schwartz et al. | 343/100 |
| 3,430,243 | 2/1969 | Evans | 343/112 D |
| 3,526,886 | 9/1970 | Lubich | 340/282 |
| 3,529,682 | 9/1970 | Coyne et al. | 175/45 |
| 3,560,977 | 2/1971 | Cayzac | 343/100 |
| 3,589,454 | 6/1971 | Coyne | 175/26 |
| 3,644,825 | 2/1972 | Davis, Jr. et al. | 324/207 |
| 3,656,161 | 4/1972 | MacPherson | 343/100 |
| 3,712,391 | 1/1973 | Coyne | 175/26 |
| 3,731,752 | 5/1973 | Schad | 175/45 |
| 3,821,523 | 6/1974 | Chisholm et al. | 364/460 |
| 3,863,256 | 1/1975 | Smith | 364/460 X |
| 3,868,565 | 2/1975 | Kuipers | 324/207 |
| 3,900,878 | 8/1975 | Tsao | 343/112 |
| 3,906,504 | 9/1975 | Guster et al. | 343/112 |
| 4,054,881 | 10/1977 | Raab | 324/244 X |
| 4,054,881 | 10/1977 | Raab | 343/112 |
| 4,072,200 | 2/1978 | Morris et al. | 175/45 |
| 4,163,977 | 8/1979 | Polstorff | 343/112 |
| 4,197,855 | 4/1980 | Lewin | 128/653 |
| 4,208,024 | 6/1980 | Killpatrick et al. | 244/3.15 |

FOREIGN PATENT DOCUMENTS

| | | |
|---|---|---|
| 658759 | 1/1951 | United Kingdom . |
| 684229 | 5/1952 | United Kingdom . |
| 724031 | 8/1955 | United Kingdom . |
| 755886 | 2/1956 | United Kingdom . |
| 965326 | 9/1964 | United Kingdom . |
| 1111768 | 8/1968 | United Kingdom . |
| 1157899 | 4/1969 | United Kingdom . |

Primary Examiner—Edward J. Wise
Attorney, Agent, or Firm—Price, Heneveld, Huizenga & Cooper

[57] ABSTRACT

Apparatus for determining the position of a source of electromagnetic radiation relative to a remote object is disclosed. A multicomponent radiating means of unknown orientation is provided having components centered about the origin of the source. A plurality of electrical signals are applied to the components of the multicomponent source to generate a plurality of electromagnetic fields. The electromagnetic fields are multiplied and thus are distinguishable from one another. A multicomponent receiving means is disposed on the remote object. The multicomponent receiving means is provided with at least three orthogonal components for detecting and measuring components of the electromagnetic fields transmitted from the source. The source and receiving means are adapted for operation at a separation distance sufficient to insure that the far-field components of the electromagnetic fields received by the receiving means are substantially greater in magnitude than the near-field components of the fields received by the receiving means. Analyzing means is associated with the receiver for converting the received components of the electromagnetic fields into source position relative to the remote object, and the relative orientation of the remote object, without a priori knowledge of the orientation of the sensor or the relative orientation of its components. The analyzing means operates open-loop with respect to the source and determines source position orientation with at least one ambiguous combination of orientation or position.

9 Claims, 14 Drawing Figures

NEAR-FIELD AND FAR-FIELD

ELECTRIC DIPOLE RADIATION PATTERN

LOCATION COORDINATES

RECEIVER

SIGNAL FORMAT

TWO-STATE PRODUCT SOLUTION

LOCATOR FOR SOURCE OF ELECTROMAGNETIC RADIATION HAVING UNKNOWN STRUCTURE OR ORIENTATION

BACKGROUND OF THE INVENTION

This invention relates to determining the position and orientation of a remote object with respect to a reference point; and, more particularly, to radiating an electromagnetic field from the reference point, detecting the field at the remote object and analyzing the detected field to determine the position and orientation of the remote object.

The use of orthogonal coils for generating and sensing magnetic fields is well known. For example, such apparatus has received wide attention in the area of mapping magnetic fields to provide a better understanding of their characteristics. If a magnetic field around generating coils can be very accurately mapped through use of sensing coils, it has also been perceived that it might be possible to determine the location of the sensing coils relative to the generating coils based on what is sensed. However, a problem associated with doing this is that there is more than one location and/or orientation within a usual magnetic dipole field that will provide the same characteristic sensing signals in a sensing coil. In order to use a magnetic field for this purpose, additional information must therefore be provided.

One approach to provide the additional information required for this purpose is to have the generating and sensing coils move with respect to each other, such as is taught in U.S. Pat. No. 3,644,825. The motion of the coils generates changes in the magnetic field, and the resulting signals then may be used to determine direction of the movement or the relative position of the generating and sensing coils. While such an approach removes some ambiguity about the position on the basis of the field sensed, its accuracy is dependent on the relative motion, and it cannot be used at all without the relative motion.

Another approach that has been suggested to provide the additional required information is to make the magnetic field rotate as taught in Kalmus, "A New Guiding and Tracking System," IRE Transactions on Aerospace and Navigational Electronics, March 1962, pages 7–10. To determine the distance between a generating and a sensing coil accurately, that approach requires that the relative orientation of the coils be maintained constant. It therefore cannot be used to determine both the relative translation and relative orientation of the generating and sensing coils.

U.S. Pat. No. 3,868,565, assigned to the same assignee, teaches a tracking system for continuously determining at the origin of a reference coordinate system the relative translation and orientation of a remote object. The tracking system includes radiating and sensing antenna arrays each having three orthogonally positioned loops. Properly controlled excitation of the radiating antenna array allows the instantaneous composite radiated electromagnetic field to be equivalent to that of a single loop antenna oriented in any desired direction. Further control of the excitation causes the radiated field to nutate about an axis denoted a pointing vector. This tracking system is operated as a closed-loop system with a computer controlling the radiated-field orientation and interpreting the measurements made at the sensing antenna array. That is, an information feedback loop from the sensing antenna array to the radiating antenna array provides information for pointing the nutation axis toward the sensing antenna array. Accordingly, the pointing vector gives the direction to the sensing antenna array from the radiating antenna array. The proper orientation of the pointing vector is necessary for computation of the orientation of the remote object. The signals detected at the sensing antenna include a nutation component. The nutating field produces a different nutation component in each of the three detected signals. The orientation of the sensing antenna array relative to the radiated signals is determined from the magnitudes of these components.

U.S. Pat. No. 4,054,881, assigned to the same assignee, teaches a magnetic or near-field non-tracking system for determining, at a remote object, the position of the remote object with respect to a reference coordinate system. The orientation of the remote object can be determined, at the remote object, with respect to the reference coordinate system by using an iterative computational scheme. This is accomplished by applying electrical signals to each of three mutually orthogonal radiating antennas, the electrical signals being multiplexed with respect to each other and containing information characterizing the polarity and magnetic moment of the radiated electromagnetic fields. The radiated fields are detected and measured by three mutually orthogonal receiving antennas, having a known spatial relationship to the remote object, which produces nine parameters. These nine parameters, in combination with one known position or orientation parameter are sufficient to determine the position and orientation parameters of the receiving antennas with respect to the position and orientation of the radiating antennas.

Copending, allowed, U.S. Patent application, Ser. No. 62,140 filed July 30, 1979 entitled REMOTE OBJECT POSITION AND ORIENTATION LOCATER, and assignee to the same assignee; and copending U.S. patent application Ser. No. 164,783, filed June 30, 1980, entitled REMOTE OBJECT POSITION AND ORIENTATION LOCATOR and assigned to the same assignee, teach several improvements to U.S. Pat. No. 4,054,881. In particular, two mutually orthogonal radiating antennas each transmit electromagnetic radiation to three mutually orthogonal receiving antennas. Alternately, three mutually orthogonal radiating antennas each transmit electromagnetic radiation to two mutually orthogonal receiving antennas. The first of the above noted applications discloses a near-field system and the second of the above noted applications discloses a far-field system. Measurement of the transmitted signals as received by the set of orthogonal receiving antennas produces information which, in combination with two known position or orientation parameters, is sufficient to determine in a non-iterative manner the position and orientation of the receiving antennas with respect to the position and orientation of the radiating antennas.

Copending, allowed, U.S. Patent application, Ser. No. 954,126, filed Oct. 24, 1978, assigned to the same assignee and entitled METHOD AND APPARATUS FOR TRACKING OBJECTS, now U.S. Pat. No. 4,298,874, teaches a tracking system for: (a) determining at the origin of a first body coordinate reference frame the relative position and orientation of a second body, and (b) determining at the origin of a second body coordinate reference frame the relative position and orientation of the first body. The separation distance between the bodies is not limited to the near field. Each body of the tracking system includes at least two independently oriented stub dipoles for radiating and sensing electromagnetic fields. Properly controlled excitation of the radiating antenna allows the radiated field to nutate about an axis denoted a pointing vector. The first body receives radiation transmitted from the second body and establishes the pointing angles to the second body with respect to the first body coordinate reference frame. The processing which determines the pointing angles is dependent on the fact that no modulation or nutation components exist in the radial direction. The field received by the first body can include information defining the second body's pointing angles to the first body with respect to the second body's coordinate reference frame and the relative roll about their mutually aligned pointing axes. This information is sufficient for determining the orientation of the first body relative to the second. This process is then repeated with the second body receiving radiation transmitted from the first body. Further, information can be transmitted from the first body to the second body which established a vector from the second body to a third body, thus defining the location of the third body at the second body.

However, in the context of a non-tracking far-field system there still remains a need to determine the position of a source of electromagnetic radiation relative to a remote object in the case where the source is of unknown structure and orientation.

SUMMARY OF THE INVENTION

According to the present invention these and other problems in the prior art are solved by provision of a multicomponent radiating means of unknown structure and orientation having components centered about the origin of a source or transmitter. The source includes means for applying to the plurality of radiating means electrical signals which generate a plurality of electromagnetic fields. The signals are formatted or multiplexed such that the electromagnetic fields are distinguished from one another. A multicomponent receiving means is disposed on a remote object. The receiving means is provided with at least three orthogonal components for detecting and measuring components of the electromagnetic fields transmitted by the radiating means. The three components of the receiving means are centered about the origin of a reference coordinate frame associated with the remote object. The radiating means and receiving means are specifically adapted for operation at a separation distance sufficient to insure that the far-field components of the electromagnetic fields received by the receiving means are substantially greater in magnitude than the near-field components of the electromgnetic fields received by the receiving means. Analyzing means is associated with the receiving means for converting the received components of the electromagnetic fields into source position relative to the remote object, and the relative orientation of the remote object, without a priori knowledge of the orientation of the source or the relative orientation of its components. The analyzing means operates open-loop with respect to the radiating means and determines source positon relative to the remote object with at least one ambiguous combination of orientation or position.

DESCRIPTION OF THE PREFERRED EMBODIMENTS

APPARATUS

The invention is described herein in the context of a system for determining the position and orientation of a remote object relative to a source of known structure. When encountering a source of unknown structure the system is provided with means for determining the position of the source relative to a reference coordinate frame centered at the remote object.

THREE AXIS TRANSMISSION AND THREE AXIS SENSING WITH FREQUENCY DIVISION MULTIPLEXING

Figure 1:
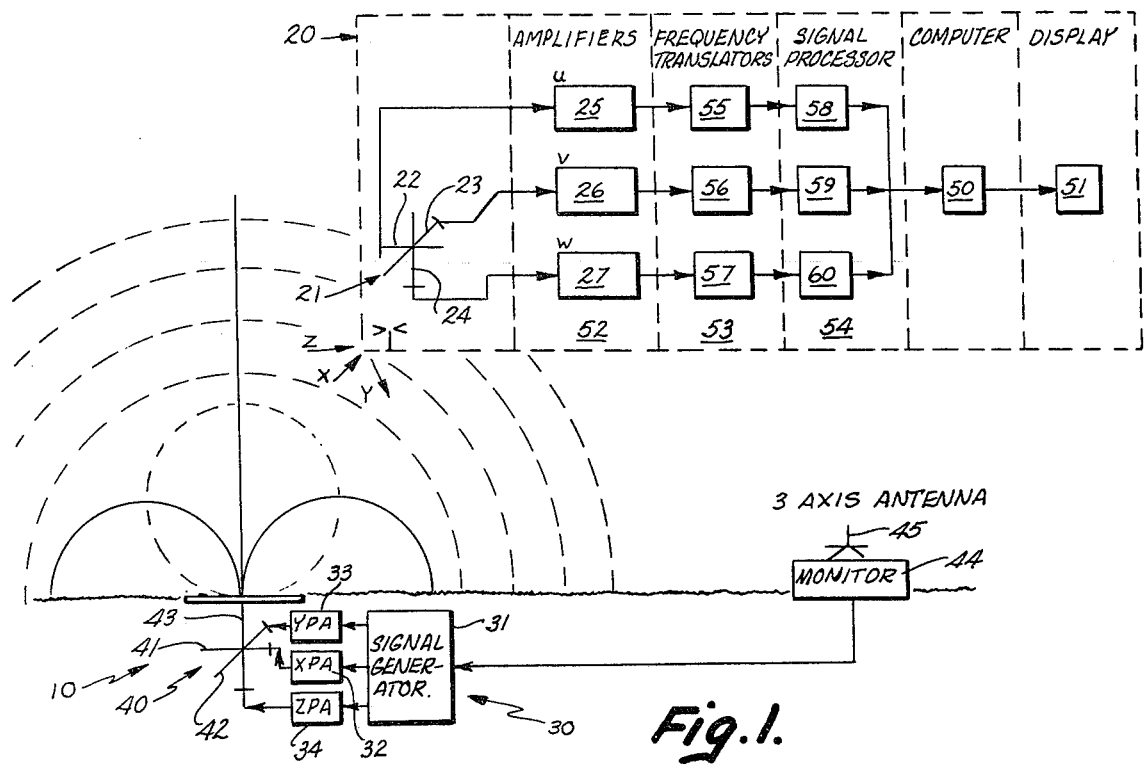
FIG. 1 is a partly block, side elevational view of a landing aid system in accordance with an embodiment of this invention.

Although the invention may have utility in a number of environments, only an embodiment relating to a long distance landing system is described in detail. Referring to FIG. 1, a landing aid system 10 includes ground based components 30 for radiating an electromagnetic field and airborne components 20 for receiving the electromagnetic field and determining the position and orientation of airborne components 20 with respect to ground based components 30. Ground based components include a signal generator 31 coupled in parallel to power amplifiers 32, 33 and 34. A ground antenna array 40 includes orthogonal electric dipole antennas 41, 42, and 43 (denoted X, Y, Z) coupled to power amplifiers 32, 33, and 34, respectively. The dipole antennas 41, 42 and 43 are short relative to the wave length of the carrier frequency so that they each produce an electric dipole-field pattern providing spatial component data unique to each antenna. A monitor receiver 44 is coupled to signal generator 31, spaced from ground antenna array 40 and has an orthogonal antenna array 45 for receiving electromagnetic radiation from ground antenna array 40. The separation distance of monitor receiver 44 from the ground antenna array 40 is such that the electromagnetic field has a far-field component substantially in excess of the near-field component. Monitor receiver 44 provides a means of verifying the electromagnetic transmission from ground antenna array 40. Airborne components 20 include a three-axis receiving antenna consisting of mutually orthogonal elements (21, 22 and 23) and analyzing means for converting the received components of the electromagnetic fields into remote object position and orientation comprising three identical channels of amplification (25, 26 and 27), frequency translation (55, 56 and 57), and signal processing (58, 59 and 60). The analyzing means also includes the computer 50 which receives the outputs of the three signal processors and calculates position and orientation for display at 51. More specifically, antenna array 21 includes receiving dipole antennas 22, 23 and 24 (denoted U, V, W) coupled sequentially to signal amplifiers 25, 26 and 27, respectively, frequency translators 55, 56 and 57, respectively, and signal processors 58, 59 and 60 respectively.

Landing aid system 10 operates "open loop" in that the only communication between airborne components 20 and ground based components 30 is the radiated electromagnetic field from ground based components 30. There need be no communication from airborne components 20 to ground based components 30 in order to establish the position and orientation of receiving antenna array 21 with respect to ground antenna array 40. Further, landing aid system 10 allows simultaneous use by any number of remote users. In addition to providing the capability for measuring position and orientation, the signals radiated by ground antenna array 40 can provide a one-way data link from ground based components 30 to receiving antenna array 21. The link can carry information such as transmitter identification, transmitter power, field distortion corrections, locations of nearby obstacles, the location of the landing site relative to ground antenna array 40 and wind direction.

Figure 2:
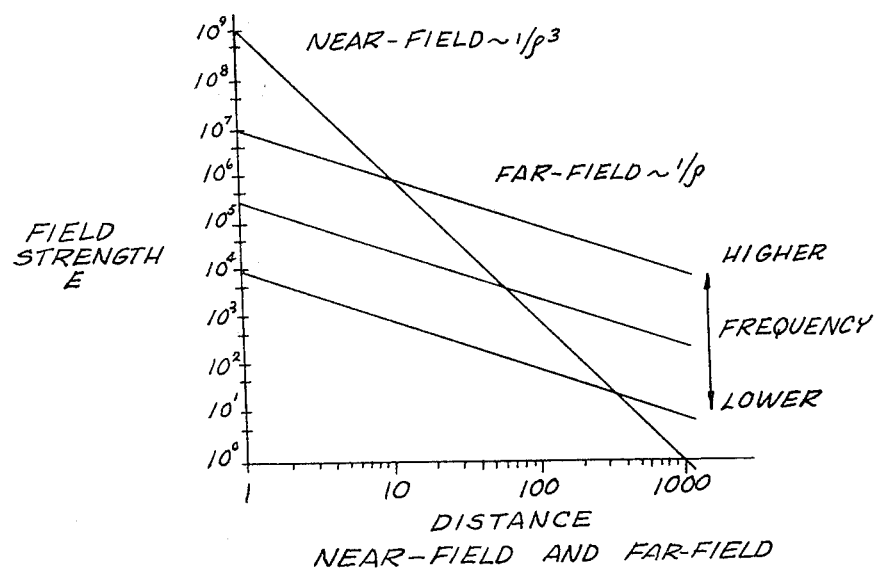
FIG. 2 is a graphical representation showing the relationship between electric field strength and distance from a radiator.

Referring to FIG. 2, the field produced by excitation of a dipole antenna can be separated into two components referred to as the near-field and the far-field components. According to the present invention, the separation distance of the remote object from the transmitting means is limited to far-field conditions. The far-field component of the transmitted electromagnetic radiation decreases linearly as the distance between the remote object and the transmitter increases. The intensity of the far-field depends on the relative size of the antenna and the wave length of the excitation frequency. For electrically short antennas, as the wave length of the excitation frequency is shortened, or the excitation frequency is increased, the strength of the far-field component increases. The far-field component of electromagnetic radiation is generally used for long distance communications and navigation. On the other hand, the near-field component of electromagnetic radiation decreases with the cube of the distance from the antenna preventing its detection at large distances. The intensity of the near-field is not a function of frequency and it can be quite high at short distances or low excitation frequencies which reduce field distortion. When using the far-field component, some additional field distortion occurs because of surrounding objects. The amount of distortion resulting from surrounding objects depends on the conductivity and permeability of these objects and their size and location relative to the receiving and transmitting antennas. It is possible to predict and compensate the distortion caused by nearby fixed objects and hence essentially remove position and orientation errors caused by these objects.

Ground based components 30 generate a far-field landing aid signal. Signal generator 31 generates the electrical signals which excite each of antennas 41, 42 and 43. The signal must be multiplexed so receiving antenna array 21 can distinguish the electromagnetic radiation from each of the antennas 41, 42 and 43. Although the list is not exhaustive, the electromagnetic radiation transmitted from each of the antennas 41, 42 and 43 may be distinguished by using time division multiplexing, frequency multiplexing, phase multiplexing and spread spectrum multiplexing. Additionally, the electrical signal may contain information characterizing the phase of the electromagnetic radiation. A simple example would be to include a timing pulse whenever the signal goes positive. Alternatively, if frequency multiplexing is used, the excitation to each of antennas 41, 42 and 43 is advantageously coherent. That is, periodically all of the signals go positive simultaneously (see FIG. 6). Additionally, the data frequency determines the spacing between the carrier frequencies, and is thus the basic reference frequency of signal generator 31. The data frequency is labeled $f_o$ in FIG. 6. Advantageously, the reference frequency will be derived from a temperature compensated crystal oscillator in the 10 MHz range and frequency selection will be in 10 kHz steps.

The three power amplifiers 32, 33 and 34 boost the outputs of signal generator 31 to a level sufficient to produce the desired power with the given antenna. To make efficient use of the power available, a switching power amplifier may be used. For example, either class D (carrier frequency switching) with a class S (high frequency switching) modulator can be used. An RFI filter is advantageously also included.

Ground antenna array 40 includes mutually orthogonal dipole antennas 41, 42 and 43 and may be located near the landing pad. The relationship of the landing pad to ground antenna array 40 can be included in the one-way data stream to airborne components 20. Antenna design in the far-field context is highly dependent on the operating carrier frequency. For a long distance landing aid system 10, a carrier frequency of 220 MHz is appropriate. A dipole antenna whose length is approximately one-tenth of the wave length of the carrier frequency would give a dipole length of approximately 12 centimeters.

Monitor receiver 44 is similar to an airborne receiver, but omits position/orientation computations, data decoding, and display. Its function is to insure that electromagnetic field amplitudes and phases radiated from ground antenna array 40 are correct. When deviations are found, change instuctions are issued to the signal generator. If signals cannot be maintained within prescribed tolerances, the monitor can place an out-of-tolerance message in the data stream. Of course, it can be appreciated that monitor receiver 44 is not necessary to an embodiment of this invention.

Airborne components 20 of landing aid system 10 for a frequency division multiplexing embodiment are shown in FIG. 1 and having a separate signal processing path for each of the signals from receiving dipole antennas 22, 23 and 24. Although there is additional discussion below of various multiplexing alternatives, it can readily be appreciated that if time division multiplexing were used, a single path could be switched among antennas 22, 23 and 24.

Figure 7:
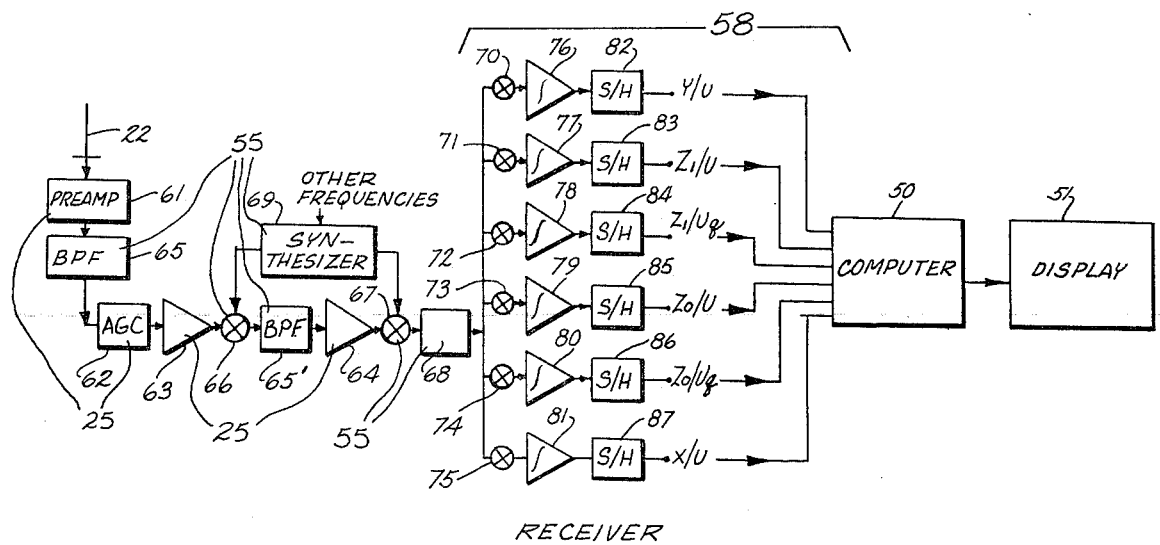
FIG. 7 is a block diagram of a portion of the receiver in accordance with an embodiment of this invention.

FIG. 7 shows a more detailed block diagram of a signal path, in particular the U antenna signal path. For practical reasons, amplifier group 52 and frequency translator group 53 are broken into several components and spread throughout the signal path. More specifically, U amplifier 25 of amplifier group 52 includes a preamplifier 61, gain control 63, amplifier 62 and amplifier 64. Frequency translator 55 of frequency translator group 53 includes band pass filters 65 and 65', mixer 66, mixer 67, low pass filter 68 and synthesizer 69. Accordingly, receiving dipole antenna 22 is coupled to preamplifier 61, band pass filter 65, gain control 62, amplifier clipper 63, mixer 66, band pass filter 65, amplifier clipper 64, mixer 67 and low pass filter 68. Synthesizer 69 is connected to mixers 66 and 67. The output of low pass filter 68 is connected to signal processor 58.

Signal processor 58 includes parallel combinations of the sequential connection of a mixer, an integrator and a sample-and-hold block. More specifically, each of the parallel paths has mixers 70 through 75, integrators 76 through 81 and sample-and-hold blocks 82 through 87. The outputs from sample-and-hold blocks 82 through 87 are coupled to computer 50 and in turn coupled to display 51. In this embodiment, there are six parallel paths for processing the signal from the U antenna. There is one path for signals received from the Y transmitting antenna received by the U receiving antenna, denoted Y/U. Similarly, there is one path for signals received from the X transmitting antenna received by the U receiving antenna, denoted X/U. The transmitted signal from Z antenna has two frequencies for carrying a binary code and requires two paths, denoted $Z_1/U$ and $Z_0/U$. Further, during acquisition two additional signals are processed so data transmitted by the Z antenna is not lost. These signals paths are denoted $Z_1/Uq$ and $Z_0/Uq$ and have negligible output when the receiver is locked on the transmitted frequencies.

The metal aircraft upon which receiving antenna array 21 is mounted causes some distortion of the electromagnetic fields received by the antenna. Unless the aircraft is very close to the transmitter, this distortion may be described by a linear transformation which maps the free space fields into three antennas 22, 23 and 24. For example, a field aligned exactly with the length of the aircraft will also appear in the transverse and vertical receiving antennas. This effect is constant for a given aircraft and installation. It is easily corrected by applying an inverse linear transformation to the measured data.

The input bandwidth of amplifier group 52 is advantageously restricted to the 219–221 MHz band after which the signals are boosted to a suitable level and noise impulses are clipped. Accurate gain control is used to obtain maximum effectiveness in clipping noise. Alternatively, an impulse detector may be applied at this point to shut off amplifier 25 when an impulse occurs. The signal is now translated downward to a convenient intermediate frequency such as 10 MHz. The bandwidth is also reduced to 100 kHz. After the final amplification and clipping, the signal is translated downward to approximately 100 kHz for final processing.

The mixing frequencies required to accomplish the necessary frequency translation are synthesized by standard techniques. The first mixing frequency is selectable in 10 kHz steps from 209–211 MHz. This allows any selected signal in the 219–221 MHz band to be translated to 10 MHz. The second mixing frequency of 10.1 MHz is fixed and translates the 10 MHz intermediate frequency to the 100 kHz processing frequency. For initial acquisition, these frequencies are synthesized from a stable reference oscillator. After acquisition, they can be locked to the received signal to remove any frequency error.

Signal processor group 54 must acquire the received signals, establish the timing reference, make measurements for position/orientation computations, and decode transmitted data. To do this, it uses a series of phase-locked loops, frequency dividers, and integrators. Interface with computer 50 is accomplished by an A/D converter and a suitable buffer. Signal acquisition is accomplished by the equivalent of a pair of phase-locked loops. In this particular example, as stated, frequency multiplexing is used and data is carried only by one radiating antenna (the Z signal shown in FIG. 6). The frequencies for carrying data, i.e. ones and zeros, on the Z signal are referred to as the mark and space frequencies. Accordingly, the phase-locked loops can operate at, for example 110 KHz to correspond to the mark and space frequencies of the Z signal. Loop bandwidth may be changed for initial acquisitions and later tracking, but in either case, it will be sufficiently low to cause the loop to ignore the effects of the frequency shift keying. The 10 kHz reference timing is obtained as the difference between the frequencies of the two oscillators generating the mark and space frequencies. Actual implementation can use measurements of both the sine and cosine integrals for measurement and locking, respectively.

Signal measurements are made by mixing a received signal with a locally generated signal and integrating the product. A coherent set of mixing frequencies (for example, 120, 110, 100, 90 kHz) corresponding to the four transmitting frequencies is synthesized from the 10 kHz reference frequency. The Integrators 76–81 are advantageously reset about evey 0.001 seconds by the reference signal. The value in each of the integrators is transferred to sample-and-hold circuits 82–87 just prior to the resetting of integrators 76–81.

Decoding of the data and averaging of the measurements is accomplished by software. Computer 50 can measure signal amplitude and signal-to-noise ratio on a sample-by-sample basis. Navigation measurements of the X and Y signals are accomplished simply by summing an appropriate number of 0.001 second samples. A similar procedure is used on the Z channel for initial acquisition. When measurements indicate a satisfactory signal-to-noise ratio, data may be extracted by comparing the Z-mark samples to the Z-space samples. Z-navigation information is based on an average of those samples corresponding to the data received. That is, only the Z-mark or Z-space sample at a given sampling point is used, depending on the decision about which carrier was transmitted during that interval.

The computer and display can be common to both long distance landing aid system 10 and the landing aid systems disclosed in U.S. Pat. No. 4,054,881 to Frederick H. Raab issued Oct. 18, 1977 entitled REMOTE OBJECT POSITION LOCATER and copending application Ser. No. 62,140 filed July 30, 1979, to Raab, entitled REMOTE OBJECT POSITION LOCATER, both assigned to the same assignee. Both the aforementioned patent and patent appliciation are hereby incorporated by reference. This is particularly advantageous for reducing cost and for simplification of equipment. Further, an aircraft may use the present long distance landing aid system 10 to navigate to within a few kilometers of the landing point and then acquire signals from the landing aid systems disclosed in the aforementioned patent and application for final approach guidance. The computer and display can be anything suitable and are therefore not discussed here in detail.

TWO AXIS TRANSMISSION OR TWO AXIS SENSING WITH FREQUENCY DIVISION MULTIPLEXING

Although FIGS. 1 and 7 detail a landing aid system 10 utilizing three transmitting antennas, 41, 42 and 43, and three receiving antennas 22, 23 and 24, a landing aid system utilizing two transmitting antennas 41 and 42, and three receiving antennas 22, 23 and 24, or a landing aid system utilizing three transmitting antennas 41, 42 and 43, and two receiving antennas 22 and 23, may be provided. Two axis transmission with three axis sensing simplifies the transmitter. This arrangement also brings about an increase in processing in the case where time division multiplexing is used to distinguish the signals applied to each axis of the transmitting antenna array. Three axis transmission with three axis sensing simplifies the receiver. However, the use of two antennas for either transmitting or receiving does add an additional ambiguity to the system. This can be corrected by, in addition to specifying that the airplane is flying right-side-up or upside down, specifying that the airplane is approaching the landing site from either the north or south, or the east or west. Apparatus for transmitting with only two orthogonal antennas is the same as that previously described with reference to FIG. 1 except that only two of the X, Y or Z signals paths are necessary. Apparatus for receiving these signals is the same as that previously described with reference to FIGS. 1 and 7 except that the remaining signal paths contain fewer parallel paths since the signal from one of the X, Y or Z transmitting antennas is not present. Apparatus for receiving three transmitted signals with only two receiving antennas is the same as that previously described with respect to FIGS. 1 and 7 except that only two signal paths are necessary for the two orthogonal receiving antennas.

TIME DIVISION MULTIPLEXING

Figure 12:
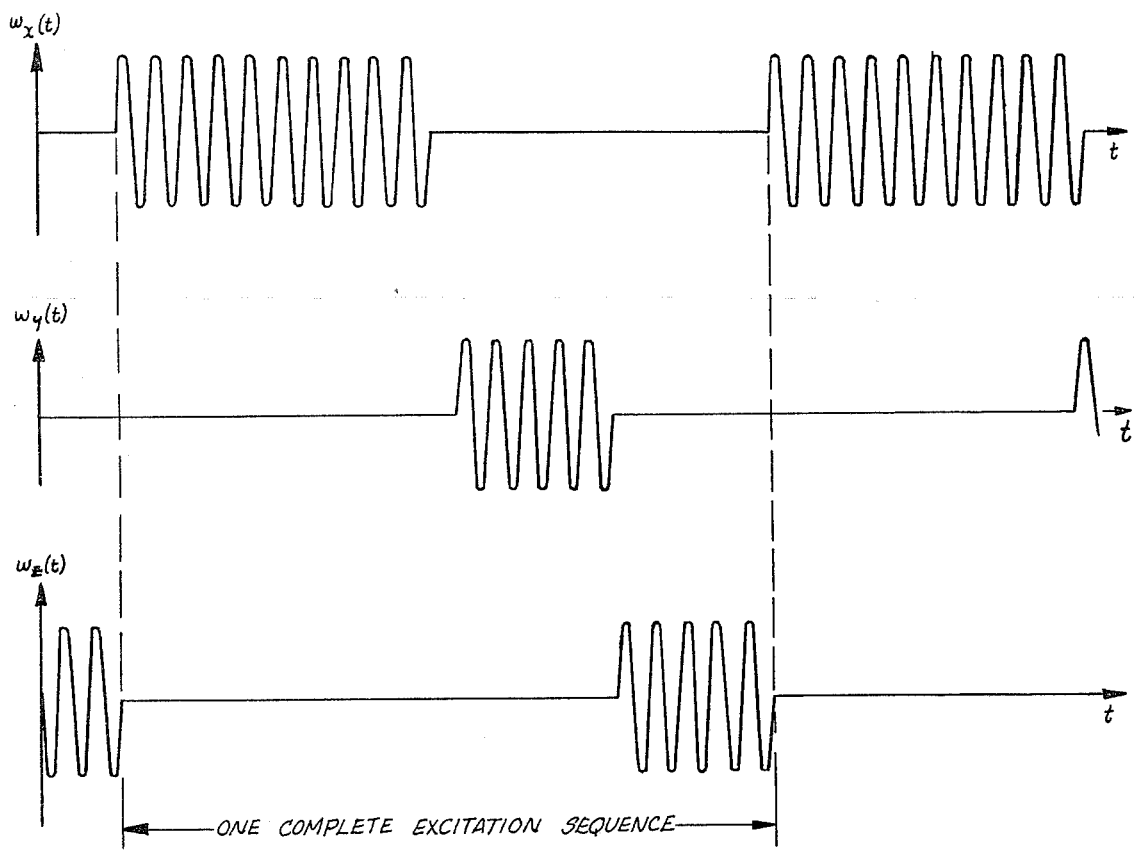
FIG. 12 is a graphical representation of the signals applied to the transmitting antennas, with respect to time, in the case where the signals are time division multiplexed.

FIG. 12 depicts a pulsed carrier wave signal format suitable for use in a time division multiplexed system. The three axes of the transmitting antenna are excited sequentially by signals of the same frequency. The durations of the three pulses are known (fixed), with the X-axis excitation pulse longer than the others to allow the receiver to establish synchronization, thereby knowing which received signals to attribute to which transmitting axis.

To allow rejection of multipath effects, a "dead space" might be inserted between the pulses to allow time for echos to die out. If multipath interference were no problem, all three axes could be excited simultaneously by signals of different frequencies or by signals modulated by different spread spectrum codes. These are ordinary engineering design decisions that must be made for each application of the disclosed concept.

Formats for two-state excitation are similar but simply omit excitation of one axis. If two-axis reception is used, a three-state excitation pattern as described above is still required.

The carrier frequency for these signals would normally be in the range of 300 to 3000 MHz with present technology. The excitation pattern could be repeated at frequencies in the range of 1 kHz to 30 MHz.

Figure 13:
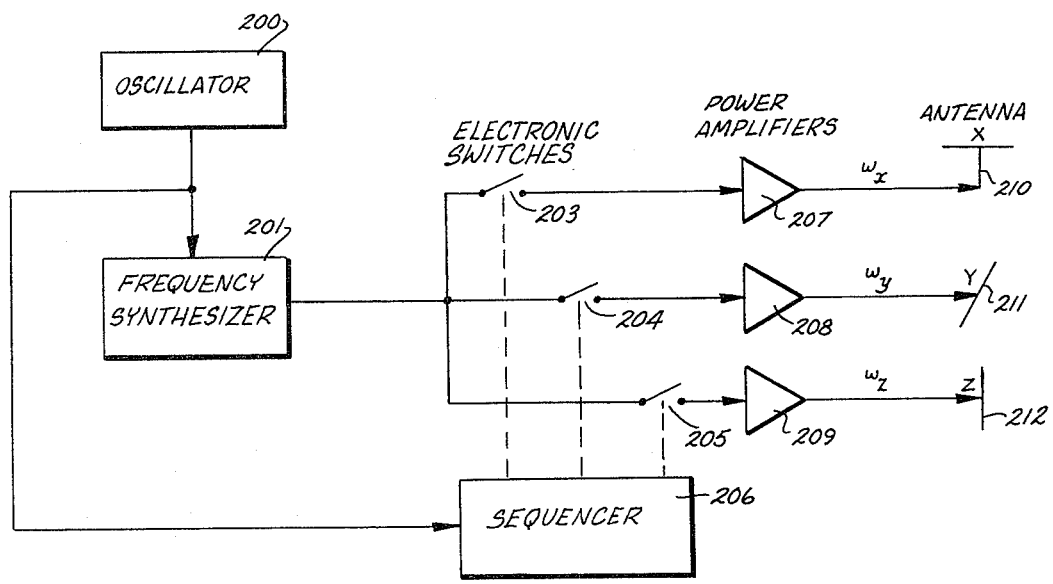
FIG. 13 is a schematic representation of a transmitter employed in a time division multiplexed system.

FIG. 13 depicts a block diagram of a transmitter for a time division multiplexed system. Note that for two-state transmission, the Z-axis of the antenna and the associated driving circuitry is omitted.

All signals in the transmitter are derived from a stable oscillator 200 by a frequency synthesizer 201. The derived radio frequency signals are switched to the power amplifiers 207, 208, and 209 by gates 203, 204, and 205, which operate under the control of a sequencer 206. The power amplifiers 207, 208 and 209 produce excitation voltages $w_x$, $w_y$, and $w_z$ as inputs to the antenna axes 210, 211, and 212, respectively. The antennas 210, 211 and 212 are dipoles that are short relative to the wavelength of the carrier frequency so as to produce an electric dipole-field pattern.

Figure 14:
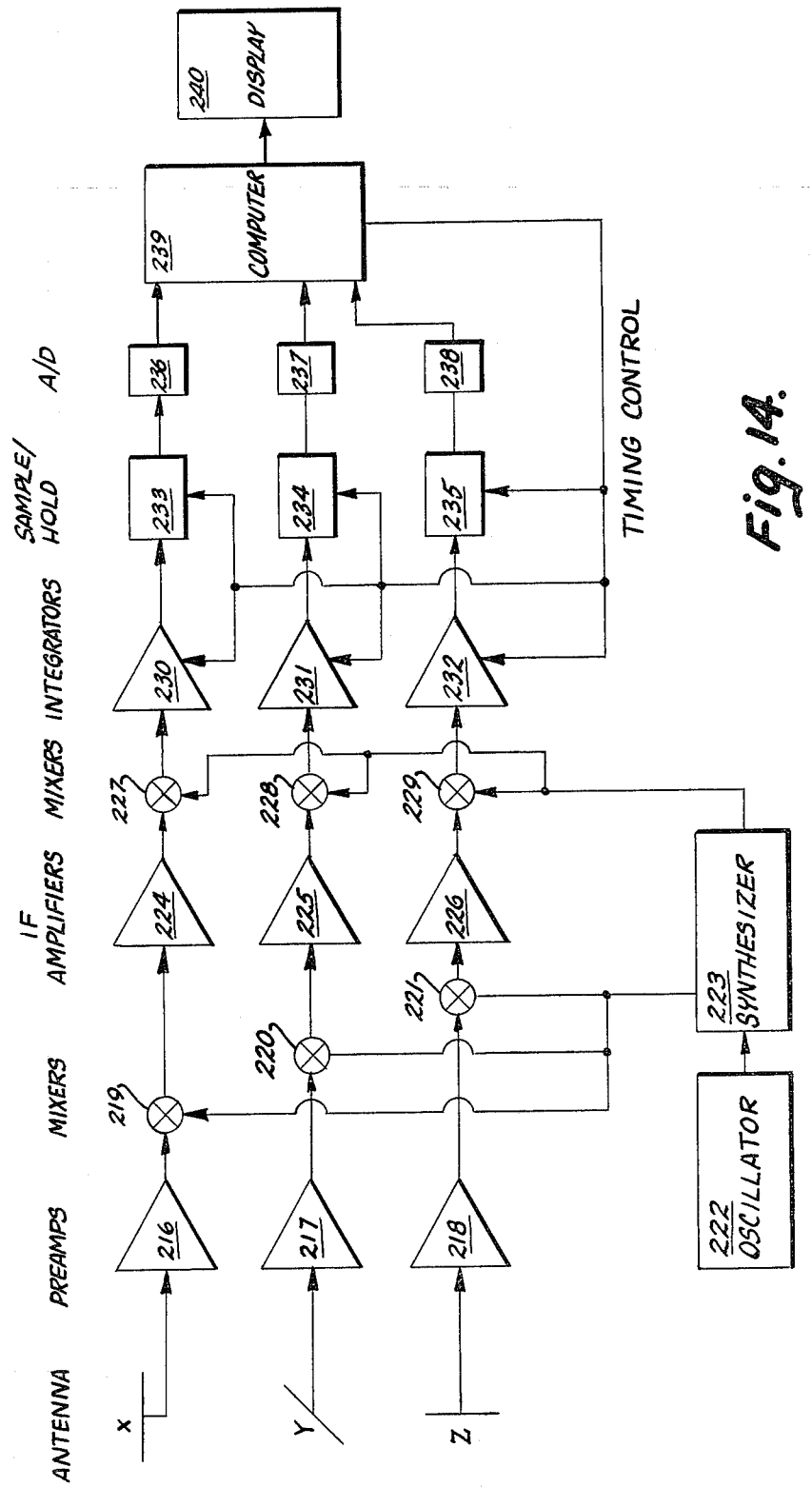
FIG. 14 is a schematic representation of a transmitter employed in a frequency division multiplexed system.

A receiver suitable for use in a time division multiplexed system is illustrated in FIG. 14. Signals are received by short dipole antennas 213, 214, and 215 and preamplified by preamplifiers 216, 217, and 218. Note that for two-axis reception of three-state transmissions, one receiving antenna and the associated amplifiers can be omitted.

After preamplification, the three received signals are converted to an intermediate frequency by mixers 219, 220, and 221, which are driven by signals produced by an oscillator 222, and a synthesizer 223. Note that all signals and timing in the receiver are derived from one master oscillator. Not shown is apparatus for phase-locking to the received signal, which may be added and is standard technology.

Intermediate-frequency signals are amplified by amplifiers 224, 225, and 226. The amplified intermediate-frequency signals are mixed with signals of same frequency in mixers 227, 228, and 229. The outputs of these mixers are integrated by integrators 230, 231, and 232, and sampled by 233, 234, and 235; outputs are acquired by the computer 239, which performs the required mathematical operations to extract position and orientation information, which is displayed by 240. The mathematical operations hereinafter developed are equally applicable to time division multiplexed and frequency division multiplexed signal formats as well as many other types of signal formats.

OPERATION

Figure 6:
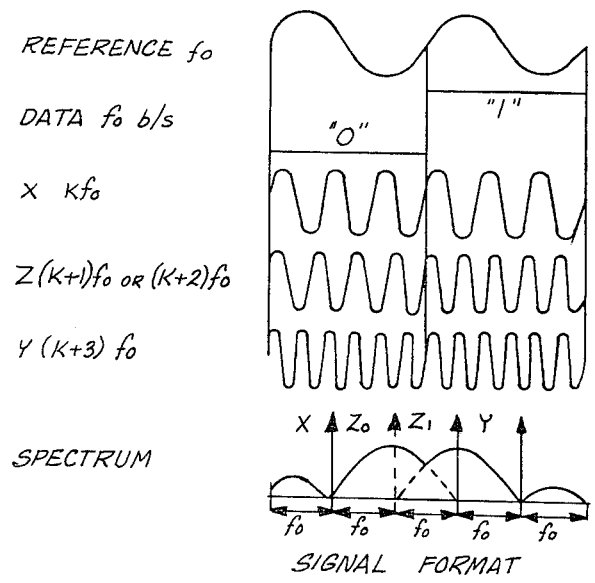
FIG. 6 is a graphical representation of the amplitude of the signals applied to the transmitting antennas, with respect to time, in the case where the signals are frequency division multiplexed.

Referring now back to the frequency division multiplexing embodiment illustrated in FIGS. 1, 6 and 7, if unambiguous measurements are desired geometrical considerations result in inclusion of a timing reference in the transmitted signal. They also require airborne components 20 to measure the signal components induced in each receiving antenna 22, 23 and 24 by each transmitting antenna 41, 42 and 43. These requirements and any additionally desired data transmission form the constraints on signal format. While any choices are possible, coherent frequency division multiplex/frequency shift keying may be suitable for many general purpose users.

Figure 5:
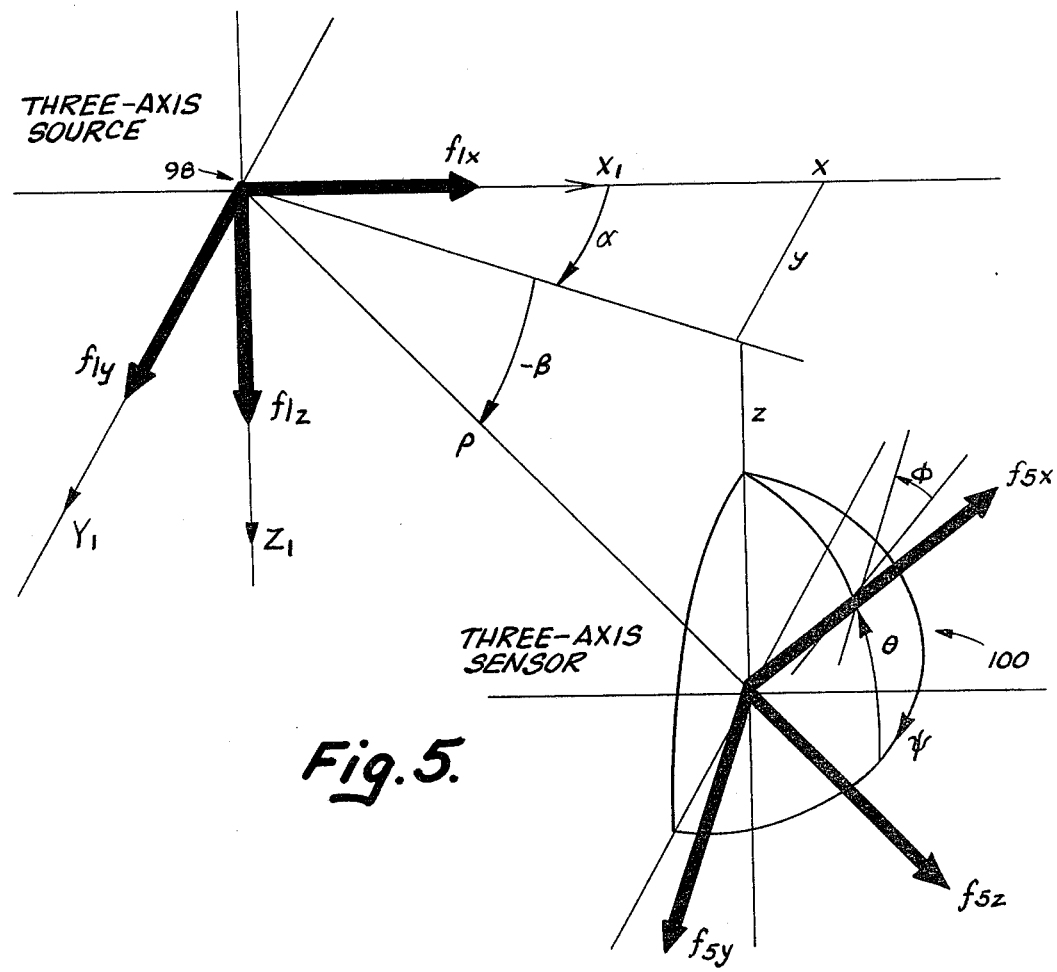
FIG. 5 is a graphical representation of the orientation coordinate system of the remote object with respect to the reference coordinate frame.

It should be noted that in order to facilitate the orderly development of a position and orientation finding algorithm, the three transmitting antennas will be designated a three axis source 98, and the three receiving antennas will be designated a three axis sensor 100. (FIG. 5)

FAR FIELD COUPLING

Excitation of an electric dipole or loop (magnetic dipole) antenna produces terms that vary as $1/\rho^3$, $1/\rho^2$, and $1/\rho$, which are referred to as quasi-static (near) field, induction field, and far field, respectively. At large distances ($\rho \gg \lambda/2\pi$), the far-field terms dominate and the resultant electric and magnetic fields form essentially plane waves. The electric and magnetic field vectors are orthogonal to each other and both are orthogonal to the direction of propagation. The cross product of the electric and magnetic field vectors, called the Poynting vector, represents power flow, and is oriented in the direction of propagation.

Figure 3:
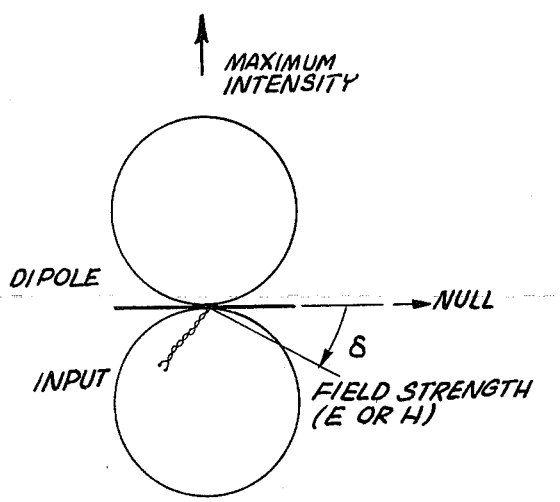
FIG. 3 is a simplified representation of a electric field associated with a current-carrying electric dipole.

It is convenient to think of far-field coupling in terms of the behavior of electric dipoles, although essentially the same relationships hold for magnetic dipole (loop) sources and sensors. The electric field resulting from the excitation of an electrically short dipole is:

$$E_t = (Il\pi/\lambda^2 \rho) \sin \delta \qquad (1)$$

where the excitation current is $I \cos \omega t$, the antenna length is $l$, and $\lambda$ is the wavelength of the carrier frequency. The off-axis angle $\delta$ and the field pattern for each antenna are defined by Equation (1) and are shown in FIG. 3. Note that in contrast to the near-field, the far-field intensity varies as the inverse of distance and is frequency dependent.

The magnetic field vector is related to the electric field vector by the free-space impedance $\eta \simeq 377\Omega$, thus $$|H| = (|E|/\eta) \qquad (2)$$

In the receiving or (or sensing) mode, a dipole has the same pattern as it does in transmitting. An elementary dipole sensor therefore produces an output proportional to the cosine of the angle between the electric field vector and the dipole axis. Note that variation of the field strength with the sine of the off-axis angle $\delta$ is a characteristic of elementary short dipoles. This simple variation does not apply to dipoles whose lengths are a significant portion of a wavelength (0.1λ or greater) or arrays of coupled colinear elements. For example, the field strength produced by a half-wave dipole varies as $\cos(\pi/2 \cos \delta)/\sin \delta$.

Figure 4:
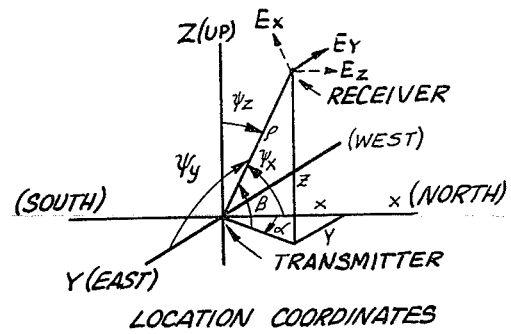
FIG. 4 is a graphical representation of the location coordinate system of the remote object with respect to the location of the origin of the reference coordinate frame.

A coordinate system for determination of the position of the receiver relative to the transmitter is shown in FIG. 4. The X, Y and Z axes are aligned with north, east, and vertical, respectively, and are centered at the center of transmitting ground antenna array 40. Location of receiving antenna array 21 may be specified in either rectangular coordinates (x, y, z) or in polar coordinates ($\alpha, \beta, \rho$). It may also be specified by the distance $\rho$ and two of the three orientation angles $\psi_x$, $\psi_y$, or $\psi_z$.

Measurement of the three transmitted signals from ground antenna array 40 as received by the set of three orthogonal receiving antennas 22, 23 and 24 produces nine parameters which are sufficient to determine the six position and orientation parameters. As noted earlier this assumes one orientation or position parameter is independently determined. While there are a variety of computational algorithms that can be used, it is conceptually easiest to begin by using relative amplitudes to determine position.

The first step in synthesizing a position and orientation finding algorithm is the definition of coordinates and vector-matrix formulations relating sensor output to source excitation.

The geometric relationship between the three-axis source 98 and the three-axis sensor 100 is shown in FIG. 5. The source coordinate frame $X_1 - Y_1 - Z_1$ is defined by the axes of the source 98. Alignment of these axes with some convenient natural reference such as north, east and down is assumed. The source axes can be effectively aligned with any desired coordinate frame by altering the excitation. Similarly, coordinates measured in the source coordinate frame can be converted to any desired coordinate frame mathematically.

The sensor position is specified in rectangular (x, y, z) or spherical ($\alpha, \beta, \rho$) coordinates defined relative to the source coordinate frame. Sensor orientation is specified by a sequence of three rotations. Azimuthal rotation by $\psi$ first turns the sensor about its Z axis from $+X$ toward $+Y$. The elevation rotation by $\theta$ then turns the sensor about its Y axis from $+X$ to $-Z$. Finally, a roll rotation by $\phi$ turns the sensor about its X axis from $+Y$ to $+Z$. Note that in the zero-orientation condition, the three sensor axes are parallel to the corresponding source axes, and that the order of the rotations cannot be interchanged without changing the values of $\psi$, $\theta$, and $\phi$.

The excitation of a three-axis electric dipole source 98 and the resultant three-axis sensor output are most conveniently described in vector notation. The excitation of the source is therefore represented by $\underline{f}_1 = [f_{1x}, f_{1y}, f_{1z}]^T$. The lengths of the three dipoles are assumed to be identical, hence $f_{1x}$, $f_{1y}$, and $f_{1z}$ represent the amplitudes of the currents exciting the dipoles of X-axis, Y-axis, and Z-axis orientation, respectively.

Figure 8:
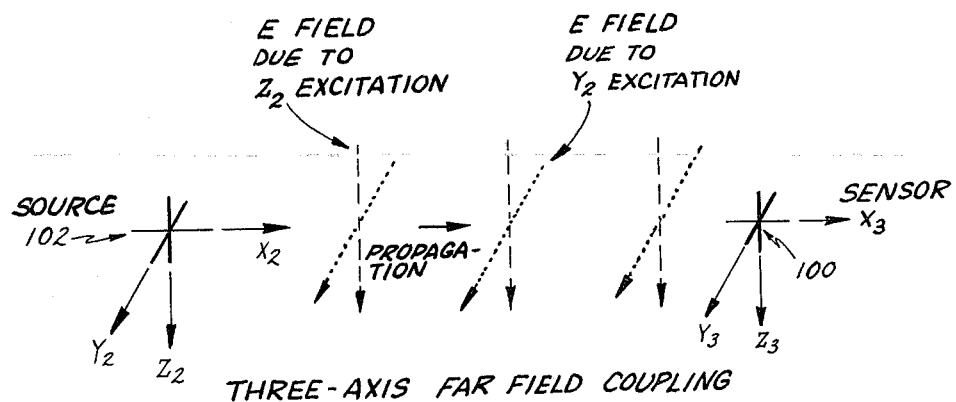
FIG. 8 is a graphical representation of the far-field electromagnetic coupling of a three axis sensor to a three axis source.

Now let the output of a three-axis sensor be similarly represented by $\underline{f}_3 = [f_{3x}, f_{3y}, f_{3z}]^T$, and consider the coupling between that sensor and a similarly aligned source $\underline{f}_2$. FIG. 8 depicts a three-axis source 102 and a three-axis sensor 100 whose coordinate frames are aligned. Since the sensor 100 is located on the $X_2$ axis, the sensor 100 is in the null of the $X_2$ dipole, hence the $X_2$ excitation produces no sensor response on any axis. The source $Y_2$ axis is parallel to the sensor $Y_3$ axis, and therefore produces a response in that axis. However, the electric field resulting from $Y_2$ axis excitation is orthogonal to the sensor $Z_3$ axis and hence produces no $Z_3$ response. Coupling between the source $Z_2$ excitation and the sensor $Y_3$ and $Z_3$ axes is analogous.

If the three-axis source excitation is represented as a vector $\underline{f}_2$ and the three-axis sensor output is similarly represented as a vector $\underline{f}_3$, the source-to-sensor coupling can be described by:

$$\underline{f}_3 = \frac{C}{\rho} \underline{S} \, \underline{f}_2 = \frac{C}{\rho} \begin{bmatrix} 0 & 0 & 0 \\ 0 & 1 & 0 \\ 0 & 0 & 1 \end{bmatrix} \underline{f}_2 \qquad (3)$$

The factor C accounts for excitation and sensing constants common to all axes. Note that the far-field coupling matrix $\underline{S}$ (shown above) is degenerate and differs from the near-field coupling matrix.

The coupling between a source 98 and sensor 100 of arbitrary position and orientation (FIG. 5) can be determined by inserting orthogonal rotation matrices into Equation (3). These matrices are based upon position azimuth and elevation ($\alpha$ and $\beta$) and orientation azimuth, elevation, and roll ($\psi$, $\theta$, and $\phi$), as shown in Table 1. Note that the subscript defines both the type of transformation and its independent variable.

TABLE 1

| | Position | | Orientation | |
|---|---|---|---|---|
| Azimuth rotates X into Y | $T_\alpha =$ | $\begin{bmatrix} \cos\alpha & \sin\alpha & 0 \\ -\sin\alpha & \cos\alpha & 0 \\ 0 & 0 & 1 \end{bmatrix}$ | $T_\psi =$ | $\begin{bmatrix} \cos\psi & \sin\psi & 0 \\ -\sin\psi & \cos\psi & 0 \\ 0 & 0 & 1 \end{bmatrix}$ |
| Elevation rotates X into $-Z$ | $T_\beta =$ | $\begin{bmatrix} \cos\beta & 0 & -\sin\beta \\ 0 & 1 & 0 \\ \sin\beta & 0 & \cos\beta \end{bmatrix}$ | $T_\theta =$ | $\begin{bmatrix} \cos\theta & 0 & -\sin\theta \\ 0 & 1 & 0 \\ \sin\theta & 0 & \cos\theta \end{bmatrix}$ |
| Roll rotates Y into Z | not applicable | | $T_\phi =$ | $\begin{bmatrix} 1 & 0 & 0 \\ 0 & \cos\phi & \sin\phi \\ 0 & -\sin\phi & \cos\phi \end{bmatrix}$ |

Inverses $$T_\alpha^{-1} = T_{-\alpha}, \quad (T_\beta T_\alpha)^{-1} = T_{-\alpha} T_{-\beta}$$

Consider first the coupling between the source and a zero-orientation sensor (whose output is $\underline{f}_4$), located at ($\alpha$, $\beta$, $\rho$), as shown in FIG. 5. The excitation $\underline{f}_2$ of an equivalent source 102 whose X-axis is aligned with the line connecting the source 98 and sensor 100 can be determined by rotating the excitation vector of the real source 98 by position azimuth and elevation, thus $$\underline{f}_2 = T_\beta T_\alpha \underline{f}_1 \tag{4}$$

The coupling to a similarly aligned equivalent sensor $f_3$ then has the same form as Equation (3), i.e., $\underline{f}_3 = (C/\rho) \underline{S}\, \underline{f}_2$. The output of the zero-orientation sensor is then found by applying inverse position rotations, thus $$\underline{f}_4 = \frac{C}{\rho} T_{-\alpha} T_{-\beta} \underline{S}\, T_\beta T_\alpha \underline{f}_1 = \frac{C}{\rho} \underline{Q}\, \underline{f}_1 \tag{5}$$

The equivalent sources and sensors used above are listed in Table 2.

TABLE 2

| SYMBOL | NAME | DEFINITION |
|---|---|---|
| $\underline{f}_1$ | Source | — |
| $\underline{f}_2$ | Position-frame source | $\underline{f}_2 = T_\beta T_\alpha \underline{f}_1$ |
| $\underline{f}_3$ | Position-frame sensor | $\underline{f}_3 = \frac{C}{\rho} \underline{S}\, \underline{f}_2$ |
| $\underline{f}_4$ | Zero-orientation sensor | $\underline{f}_4 = T_{-\alpha} T_{-\beta} \underline{f}_3$ |
| $\underline{f}_5$ | Sensor | $\underline{f}_5 = T_\phi T_\theta T_\psi \underline{f}_4$ |

Utilizing Table 1 and equations (3) and (4) $\underline{f}_3$ can be expanded as follows:

$$\underline{f}_3 = \frac{C}{\rho} \underline{S}\, T_\beta T_\alpha \underline{f}_1 \tag{6}$$

$$= \frac{C}{\rho} \begin{bmatrix} 0 & 0 & 0 \\ 0 & 1 & 0 \\ 0 & 0 & 1 \end{bmatrix} \begin{bmatrix} \cos\beta & 0 & -\sin\beta \\ 0 & 1 & 0 \\ \sin\beta & 0 & \cos\beta \end{bmatrix} \begin{bmatrix} \cos\alpha & \sin\alpha & 0 \\ -\sin\alpha & \cos\alpha & 0 \\ 0 & 0 & 1 \end{bmatrix} \underline{f}_1 \tag{7}$$

$$= \frac{C}{\rho} \begin{bmatrix} 0 & 0 & 0 \\ -\sin\alpha & \cos\alpha & 0 \\ \cos\alpha \sin\beta & \sin\alpha \sin\beta & \cos\beta \end{bmatrix} \underline{f}_1 \tag{8}$$

The row of zeros in Equation (8) implies that no source excitation can produce a radial (position-frame $X_3$) component.

A fixed, three-state excitation pattern based upon the source axes is given by:

$$\underline{f}_1(S1) = \begin{bmatrix} 1 \\ 0 \\ 0 \end{bmatrix} \quad \underline{f}_1(S2) = \begin{bmatrix} 0 \\ 1 \\ 0 \end{bmatrix} \quad \underline{f}_1(S3) = \begin{bmatrix} 0 \\ 0 \\ 1 \end{bmatrix} \tag{9}$$

This is the same excitation pattern used by the near-field large-angle algorithm. The fields produced at the sensor location in response to these excitation vectors are then:

$$\underline{f}_3(S1) = \frac{C}{\rho} \begin{bmatrix} 0 \\ -\sin\alpha \\ \cos\alpha \sin\beta \end{bmatrix} = \frac{C}{\rho} \begin{bmatrix} 0 \\ -y/\sqrt{x^2+y^2} \\ xz/\rho\sqrt{x^2+y^2} \end{bmatrix} \tag{10}$$

$$\underline{f}_3(S2) = \frac{C}{\rho} \begin{bmatrix} 0 \\ \cos\alpha \\ \sin\alpha \sin\beta \end{bmatrix} = \frac{C}{\rho} \begin{bmatrix} 0 \\ x/\sqrt{x^2+y^2} \\ -yz/\rho\sqrt{x^2+y^2} \end{bmatrix} \tag{11}$$

$$\text{and } \underline{f}_3(S1) = \frac{C}{\rho} \begin{bmatrix} 0 \\ 0 \\ \cos\beta \end{bmatrix} = \frac{C}{\rho} \begin{bmatrix} 0 \\ 0 \\ \sqrt{x^2+y^2}/\rho \end{bmatrix} \tag{12}$$

POSITION DETERMINATION

The output of a three-axis sensor of arbitrary orientation ($\psi$, $\theta$, $\phi$) is determined by applying orientation azimuth, elevation, and roll rotations to the output of the equivalent zero-orientation sensor, thus:

$$\underline{f}_5 = T_\phi \underline{f}_4 = \frac{C}{\rho} T_\phi T_\theta T_\psi T_{-\alpha} T_{-\beta} \underline{S}\, T_\beta T_\alpha \underline{f}_1 \tag{13}$$

Since the sensor orientation is unknown at this point in the processing, use must be made of orientation-independent signal parameters. Three such parameters are:

1. Signal power, obtained by dot products by sensor response vectors with themselves;
2. Dot products between different sensor response vectors, analogous to the angles between the response vectors; and 3. The amplitudes of the cross products between different sensor responses, analogous to the perpendiculars to the planes defined by those responses.

Several algorithms are derived subsequently; the choice of algorithm depends upon the application.

1. THREE-STATE POWER SOLUTION

The sensor responses from all three states of source excitation Equations (10), (11), and (12) can be converted to received power and processed to yield position in a manner similar to that used for near-field applications. The three "power" responses are obtained by taking dot products of the three sensor response vectors with themselves. Since the sensor orientation is determined by a set of orthogonal rotations, the power is invariant under sensor rotation. The three power outputs are:

$$P(S1) = \frac{C^2}{\rho^2} [\sin^2 \alpha + \cos^2 \alpha \sin^2 \beta] \quad (14)$$

$$P(S2) = \frac{C^2}{\rho^2} [\cos^2 \alpha + \sin^2 \alpha \sin^2 \beta] \quad (15)$$

$$P(S3) = \frac{C^2}{\rho^2} \cos^2 \beta \quad (16)$$

Distance $\rho$ is obtained from the sum of the three powers, which is independent of $\alpha$ and $\beta$, thus the calculated distance $\hat{\rho}$ equals:

$$\hat{\rho} = \sqrt{\frac{2C^2}{P(S1) + P(S2) + P(S3)}} \quad (17)$$

Rearrangement of Equation (16) then yields:

$$|\hat{\beta}| = \arccos \sqrt{\frac{\hat{\rho}^2}{C^2} P(S3)} \quad (18)$$

Substitution of $\hat{\rho}$ and $|\hat{\beta}|$ into Equation (15) then produces:

$$\hat{\alpha}_A = \arcsin \sqrt{\frac{\frac{\hat{\rho}^2}{C^2} P(S2) - 1}{\sin^2 |\hat{\beta}| - 1}} \quad (19)$$

The position defined by $\hat{\alpha}_A$, $|\hat{\beta}|$, and $\hat{\rho}$ contains an eight quadrant ambiguity (as in the near-field algorithm), which is reduced to a two-quadrant ambiguity by the signs of the dot products. The three possible dot-products are:

$$v(S1,S2) = \frac{C^2}{\rho^2} (-\sin \alpha \cos \alpha + \sin \alpha \cos \alpha \sin^2 \beta) \quad (20)$$

$$= -\frac{C^2}{2\rho^2} (\sin 2\alpha)(\cos^2 \beta)$$

$$v(S2,S3) = \frac{C^2}{\rho^2} (\sin \alpha \sin \beta \cos \beta) = \frac{C^2}{2\rho^2} \sin \alpha \sin 2\beta \quad (21)$$

and $$v(S3,S1) = \frac{C^2}{\rho^2} (\cos \alpha \sin \beta \cos \beta) = \frac{C^2}{2\rho^2} \cos \alpha \sin 2\beta \quad (22)$$

Inspection of Table 3 shows that the polarities of any two of these dot products reduces the quadrant ambiguity from 8 to 2.

TABLE 3

| Quadrant | Position Coordinates | | | | | Dot Products | | |
|---|---|---|---|---|---|---|---|---|
| | x | y | z | α | β | v(S1,S2) | v(S2,S3) | v(S3,S1) |
| 1 | + | + | − | 0°...90° | 0°...+90° | − | + | + |
| 2 | − | + | − | 90°...180° | 0°...+90° | + | + | − |
| 3 | − | − | − | −90°...−180° | 0°...+90° | − | − | − |
| 4 | + | − | − | 0°...−90° | 0°...+90° | + | − | + |
| 5 | + | + | + | 0°...90° | 0°...−90° | − | − | − |
| 6 | − | + | + | 90°...180° | 0°...−90° | + | − | + |
| 7 | − | − | − | −90°...−180° | 0°...−90° | − | + | + |
| 8 | + | − | − | 0°...90° | 0°...−90° | + | + | − |

A somewhat more direct solution can be obtained if the power responses are formulated in rectangular coordinates: First, $$P(S3) = \frac{C^2}{\rho^2} \frac{x^2 + y^2}{\rho^2} = \frac{C^2}{\rho^4} (\rho^2 - z^2) \quad (23)$$

Geometrical Similarity then requires that $$P(S1) = \frac{C^2}{\rho^2} \frac{y^2 + z^2}{\rho^2} = \frac{C^2}{\rho^4} (\rho^2 - x^2) \quad (24)$$

and $$P(S2) = \frac{C^2}{\rho^2} \frac{x^2 + z^2}{\rho^2} = \frac{C^2}{\rho^4} (\rho^2 - y^2) \quad (25)$$

Figure 10:
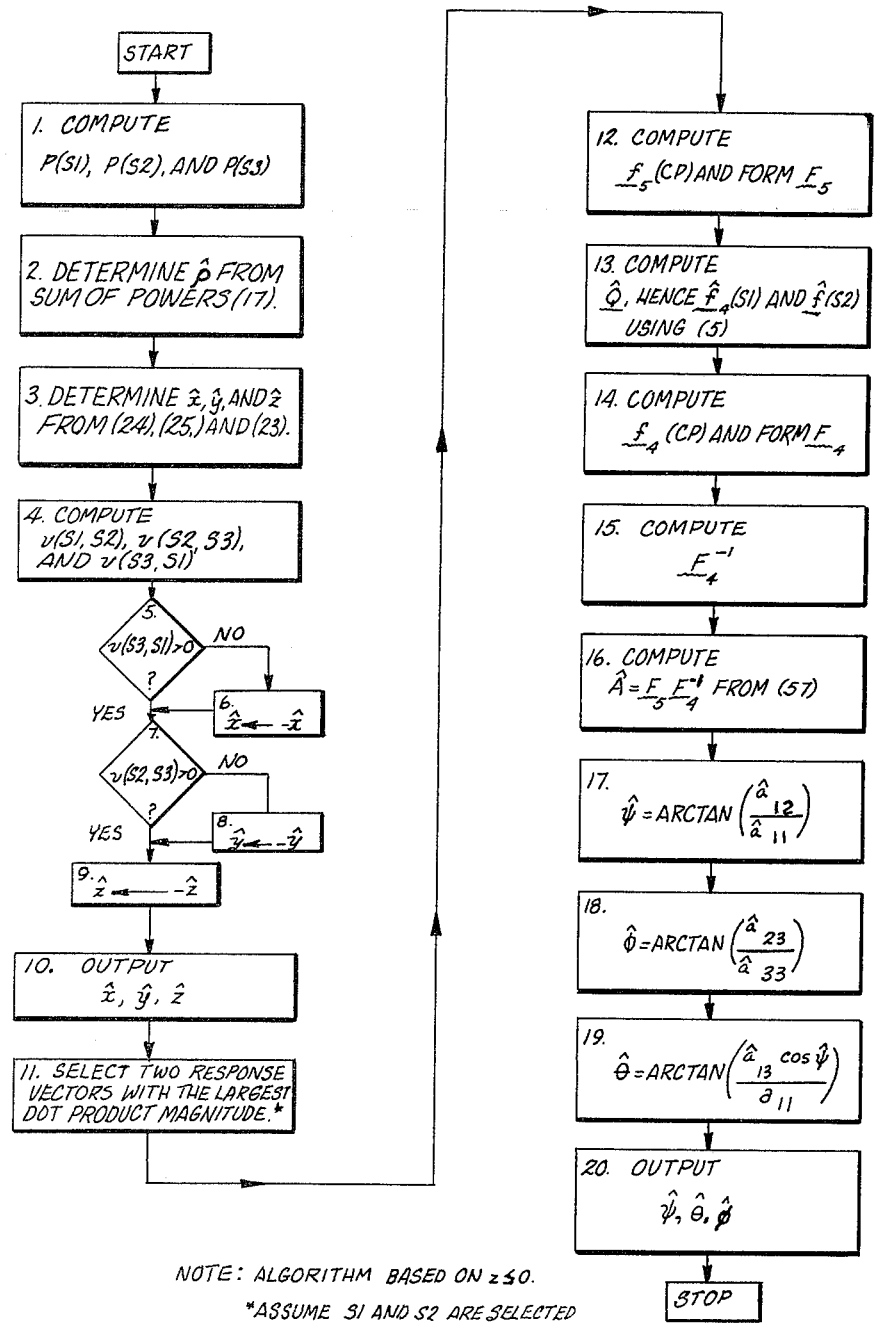
FIG. 10 is a flow chart for the computations carried out in a three-state power solution for remote object position and orientation.

Range $\hat{\rho}$ is first found by using Equation (17). Values of $\hat{x}^2$, $\hat{y}^2$, and $\hat{z}^2$ are then found by substitution of measured "power" and $\hat{\rho}^2$ into Equations (22), (24), and (25). FIG. 10 illustrates a flow diagram for the computations involved in the implementation of a three-state power solution for position. FIG. 10 also goes on to illustrate the flow diagram for the computations involved in calculating orientation from the three-state power solution for position. The mathematical operations for calculating orientation are presented later.

2. TWO-STATE POWER AND DOT PRODUCT SOLUTION

A two-state large-angle algorithm similar to that for near-field operation can be developed by using the normalization $$X = \frac{Cx}{\rho^2} \quad Y = \frac{Cy}{\rho^2} \quad Z = \frac{Cz}{\rho^2} \quad (26)$$

Equations (24) and (25) then become:

$$P(S1) = Y^2 + Z^2 \qquad (27)$$

and $$P(S2) = X^2 + Z^2 \qquad (28)$$

The first dot-product Equation (20) is then also converted to normalized rectangular coordinates $$v(S1,S2) = \qquad (29)$$

$$-\frac{C^2}{\rho^2}\left(\frac{x}{\sqrt{x^2+y^2}}\right)\left(\frac{y}{\sqrt{x^2+y^2}}\right)\left(\frac{\sqrt{x^2+y^2}}{\rho}\right)^2$$

$$= -XY \qquad (30)$$

If the dot-product Equation (30) is zero, either $X=0$ or $Y=0$ or both; which of these is the case is readily determined by whether $P(S2) > P(S1)$, $P(S1) > P(S2)$ or $P(S1) = P(S2)$, respectively. If $v(S1,S2) \neq 0$, then equation (30) can be rearranged into:

$$Y = \frac{-v(S1,S2)}{X} \qquad (31)$$

The difference of (28) and (27) then eliminates $Z_1$:

$$P(S2) - P(S1) = X^2 - Y^2 \qquad (32)$$

and substitution of Equation (31) produces an equation containing $X^2$ as the only unknown:

$$P(S2) - P(S1) = X^2 - \frac{v(S1,S2)}{X^2} \qquad (33)$$

Figure 11:
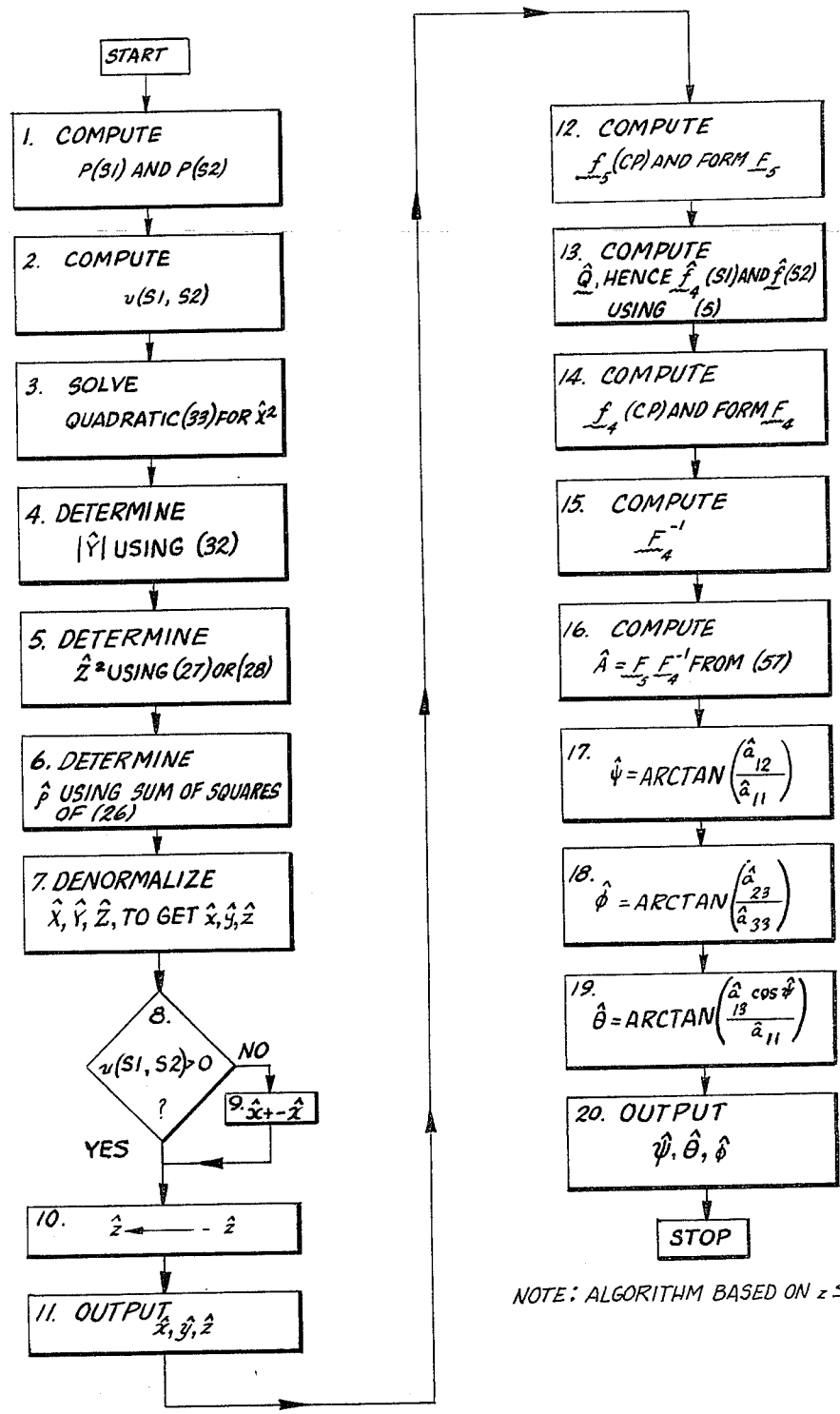
FIG. 11 is a flow chart of the computations carried out in a two-state power and dot product solution for remote object position and orientation.

This new equation can be converted into a quadratic in $X^2$ and solved. The erroneous value of $X^2$ is then discarded and the correct value is substituted into Equation (28) to determine $Z^2$. The value of $Z^2$ is then substituted into Equation (27) to determine $Y^2$. The sign of the dot product then reduces the quadrant ambiguity from 8 to 4. The 4 quadrant ambiguity is eliminated by specifying particular parameters as previously discussed. FIG. 11 illustrates a flow diagram for the computations involved in the implementation of a two-state power and dot product solution for position. FIG. 11 also goes on to illustrate the flow diagram for the computations involved in calculating orientation from the two-state power and dot product solution for position. The mathematical operations for calculating orientation are presented later.

3. THREE-STATE CROSS-PRODUCT SOLUTION

The amplitude of the cross-product of two vectors is invariant under the orthogonal sensor orientation rotations and can therefore be used to determine position independent of sensor orientation. The orientation of the cross product is, in an absolute sense, also invariant under sensor orientation. However, the cross-product is referenced to the same coordinate frame as are the vectors used to generate it. Therefore, the cross-product of two sensor responses is referenced to the sensor coordinate frame. Since the orientation of the sensor is not known at this point in the signal processing, little use can be made of the orientations of the cross products.

Inspection of the sensor-position-frame fields for the three axis excitation states Equations (10), (11), and (12) shows that all have zero X components, which implies that both the Y and the Z components of the cross products of these vectors are zero. The resultant sensor-position-frame cross-product vectors are then $$\underset{\sim}{\xi_3}(S1,S2) = \underset{\sim}{f_3}(S1) \times \underset{\sim}{f_3}(S2) \qquad (34)$$

$$= \frac{C^2}{\rho^2}\begin{bmatrix}(-\sin\alpha)(\sin\alpha\sin\beta) - (\cos\alpha)(\cos\alpha\sin\beta)\\0\\0\end{bmatrix}$$

$$= \frac{C^2}{\rho^2}\begin{bmatrix}-\sin\beta\\0\\0\end{bmatrix} \qquad (35)$$

$$\underset{\sim}{\xi_3}(S2,S3) = \underset{\sim}{f_3}(S2) \times \underset{\sim}{f_3}(S3) = \frac{C^2}{\rho^2}\begin{bmatrix}\cos\alpha\cos\beta\\0\\0\end{bmatrix} \qquad (36)$$

and $$\underset{\sim}{\xi_3}(S3,S1) = \underset{\sim}{f_3}(S3) \times \underset{\sim}{f_3}(S1) = \frac{C^2}{\rho^2}\begin{bmatrix}\sin\alpha\cos\beta\\0\\0\end{bmatrix} \qquad (37)$$

These three cross products will be rotated by yet unknown sensor orientation angles. However, the magnitudes of the cross-products (or the squared magnitudes) are unchanged, hence we can obtain, independent of sensor orientation, $$\Xi(S1,S2) = |\underset{\sim}{\xi}(S1,S2)|^2 = \frac{C^4}{\rho^4}\sin^2\beta \qquad (38)$$

$$\Xi(S2,S3) = |\underset{\sim}{\xi}(S2,S3)|^2 = \frac{C^4}{\rho^4}\cos^2\alpha\cos^2\beta \qquad (39)$$

$$\Xi(S3,S1) = |\underset{\sim}{\xi}(S3,S1)|^2 = \frac{C^4}{\rho^4}\sin^2\alpha\cos^2\beta \qquad (40)$$

The solution for $\hat{\rho}$, $\hat{\alpha}_1$, and $\hat{\beta}$ is in general similar to the solutions by other methods. First:

$$\hat{\rho} = C[\Xi(S1,S2) + \Xi(S2,S3) + \Xi(S3,S1)]^{-\frac{1}{4}} \qquad (41)$$

Substitution of $\hat{\rho}$ into (38) then produces:

$$|\hat{\beta}| = \arcsin\left[\frac{\hat{\rho}^2}{C^2}\sqrt{\Xi(S1,S2)}\right] \qquad (42)$$

and the ratio of (40) to (39) gives ambiguous azimuth:

$$\alpha_A = \arctan\left[\frac{\hat{\rho}^2}{\hat{C}^2}\sqrt{\frac{\Xi(S3,S1)}{\Xi(S2,S3)}}\right] \qquad (43)$$

This position solution contains an eight-quadrant ambiguity that can be reduced to a two quadrant ambiguity through the signs of the dot products as shown in Table 3.

4. TWO-STATE POWER AND CROSS-PRODUCT SOLUTION

It is evident that $P(S1)$, $P(S2)$, and $\Xi(S1,S2)$ produce three equations in the three unknown position parameters. To find position, first rearrange Equation (38) to produce $$\sin^2 \beta = \frac{\rho^4}{C^4} \Xi(S1,S2) \tag{44}$$

Substitution of this into the sum of Equations (14) and (15) leaves only $\rho$ as an unknown:

$$P(S1) + P(S2) = \frac{C^2}{\rho^2} + \frac{\rho^2}{C^2} \Xi(S1,S2) \tag{45}$$

After $\hat{\rho}$ has been determined, $|\hat{\beta}|$ and $\alpha_A$ can be determined in turn by substitutions into Equations (44) and (19), respectively. Quadrant ambiguity can be reduced from 8 to 4 by use of the sign of $v(S1,S2)$.

ORIENTATION DETERMINATION

Sensor orientation can be determined in a non-iterative manner from any two sensor output vectors corresponding to fields aligned with the souce axes. These sensor output vectors are synthesized from the true sensor output vectors. One advantage of non-iterative orientation determination over iterative orientation determination is an increase in processing speed. Also, non-iterative orientation determination techniques are free from 'latch up' and allow a reduction in software complexity.

The orientation rotations that convert the output of an equivalent zero-orientation sensor into the output of the true sensor 100 can be combined into a single matrix A, which can be expanded by using Table 1 to produce:

$$A = T_\phi T_\theta T_\psi = \tag{46}$$

$$\begin{bmatrix} \cos\theta\cos\psi & \cos\theta\sin\psi & -\sin\theta \\ -\cos\phi\sin\psi & \cos\phi\cos\psi & \\ +\sin\phi\sin\theta\cos\psi & +\sin\phi\sin\theta\sin\psi & \sin\phi\cos\theta \\ \sin\phi\sin\psi & -\sin\phi\cos\psi & \cos\phi\cos\theta \\ +\cos\phi\sin\theta\cos\psi & +\cos\phi\sin\theta\sin\psi & \end{bmatrix}$$

Suppose that a source excitation produces a response $\underline{f}_4(X) = [1, 0, 0]^T$ in a zero-orientation sensor (i.e. the field at the sensor location has an $X_1$-axis orientation. The output from the real sensor 100 is then $\underline{f}_5(X) = \underline{A}\underline{f}_4(X) = [a_{11}, a_{21}, a_{31}]^T$, which is the first column of $\underline{A}$. Similarly, the second and third columns of $\underline{A}$ represent the sensor responses to fields of $Y_1$-$Z_1$-axis orientations, respectively.

If the normalized sensor output vectors corresponding to fields of $X_1$-, $Y_1$-, and $Z_1$-axis orientations can be synthesized, the elements of $\underline{A}$ will be known, and the angles $\psi$, $\theta$, and $\phi$ can be determined. For example, using the sensor X-axis response to a field of $Z_1$-axis orientation, $$\hat{\theta} = -\arcsin f_{5x}(Z) = -\arcsin a_{13} \tag{47}$$

The angles $\hat{\psi}$ and $\hat{\phi}$ can now be determined by using the just-determined value of $\hat{\theta}$ to cancel the $\sin\theta$ and $\cos\theta$ factors in the responses corresponding to $a_{11}$, $a_{12}$, $a_{23}$, and $a_{33}$.

Errors in the range estimate and variation in the source power produce a multiplicative error common to all sensor output vectors. The effects of those errors can be avoided by determining orientation from ratios of sensor responses. Thus:

$$\hat{\psi} = \arctan\left[\frac{f_{5x}(Y)}{f_{5x}(X)}\right] = \arctan\left[\frac{a_{12}}{a_{11}}\right] \tag{48}$$

and $$\hat{\phi} = \arctan\left[\frac{f_{5y}(Z)}{f_{5z}(Z)}\right] = \arctan\left[\frac{a_{23}}{a_{33}}\right] \tag{49}$$

(Note that a four-quadrant inverse tangent will place $\hat{\psi}$ and $\hat{\phi}$ in the proper quadrant.) Elevation $\hat{\theta}$ can be determined from $$\hat{\theta} = \arctan\left[\frac{-f_{5x}(Z)}{f_{5x}(X)/\cos\hat{\psi}}\right] = \arctan\left[\frac{-a_{13}}{a_{11}/\cos\hat{\psi}}\right] \tag{50}$$

or three similar ratios using $a_{13}$, and $a_{12}$, $a_{23}$, or $a_{33}$. A linear combination of all four ratios can also be used to minimize the effects of noise.

While orientation is most simply determined using elements from all three synthetic sensor output vectors, inspection of the matrix $\underline{A}$ in Equation (46) shows that the information contained in any two columns is sufficient to determine all three orientation angles. Some flexibility is therefore possible in a noisy environment; e.g., orientation can be estimated from the two output vectors with minimum estimated noise. Alternatively, information from all three output vectors might be combined by linearizing the elements of $\underline{A}$ about the initial orientation estimates from Equations (48), (49), and (50). Minimum-variance linear combinations would then be formed to improve the initial estimates.

NEAR-FIELD CONDITIONS, THREE-STATE EXCITATION

Fields of $X_1$-, $Y_1$-, and $Z_1$-axis orientations are produced at the sensor location only when the sensor 100 is located on the $X_1$, $Y_1$, or $Z_1$ axis. The source excitation pattern is fixed to allow multiple sensors to derive position and orientation information from the same signals. In a near-field system with a three-state source-excitation pattern (U.S. Pat. No. 4,054,881), the responses of the sensor to fields of $X_1$, $Y_1$, and $Z_1$-axis orientations can be synthesized from the real sensor responses, which span three-dimensional vector space.

The three true sensor output vectors can be assembled into a $3 \times 3$ matrix $\underline{F}_5$, which can then be written as:

$$[\underline{f}_5(S1) \mid \underline{f}_5(S2) \mid \underline{f}_5(S3)] = \underline{F}_5 = \frac{C}{\rho^3} \underline{A} \underline{Q} \underline{I} = \tag{51}$$

$$\frac{C}{\rho} \underline{A} \underline{Q} [\underline{f}_1(S1) \mid \underline{f}_1(S2) \mid \underline{f}_1(S3)]$$

From the above equation, it is evident that the desired matrix $\hat{\underline{A}}$ of synthetic responses can be obtained as:

$$\hat{\underline{A}} = \frac{\hat{\rho}^3}{C} \underline{F}_5 \hat{\underline{Q}}^{-1} \quad (52)$$

The coupling matrix $\hat{\underline{Q}}^{-1}$ is computed using estimated values $\hat{\alpha}$ and $\hat{\beta}$. Note that actual matrix inversion is unnecessary, since $$\underline{Q}^{-1} = (\underline{T}_{-\alpha}\underline{T}_{-\beta}\underline{S}\,\underline{T}_{\beta}\underline{T}_{\alpha})^{-1} = \underline{T}_{-\alpha}\underline{T}_{-\beta}\underline{S}^{-1}\underline{T}_{\beta}\underline{T}_{\alpha} \quad (53)$$

where $$\underline{S}^{-1} = \begin{bmatrix} 1 & 0 & 0 \\ 0 & -2 & 0 \\ 0 & 0 & -2 \end{bmatrix} \quad (54)$$

FAR-FIELD CONDITIONS, THREE-OR TWO-STATE EXCITATION

While all orientation information is contained in any two sensor output vectors, synthesis of the desired sensor responses (i.e., the matrix $\hat{\underline{A}}$) requires a three-dimensional set of basis vectors. However, under far-field coupling conditions, the coupling matrix $\underline{S}$ (Equation (3)) is degenerate (rank 2). Therefore, the inverses $\underline{S}^{-1}$, hence $\underline{Q}^{-1}$, (Equations (53) and (54)) do not exist and Equation (52) cannot be used directly to synthesize orientation matrix A.

The orientation matrix $\hat{\underline{A}}$ can, however, be synthesized by using the cross product of two non-colinear sensor output vectors to provide the necessary third linearly independent vector. Suppose that the responses to state S1 and state S2 excitation are available and since orthogonal rotations preserve the angles between vectors, $$\underline{f}_5(CP) = \underline{f}_5(S1) \times \underline{f}_5(S2) = \quad (55)$$
$$[\underline{A}\,\underline{f}_4(S1)] \times [\underline{A}\,\underline{f}_4(S2)] = A\,[\underline{f}_4(S1) \times \underline{f}_4(S2)]$$

The cross products can be used in place of the vectors produced by the third excitation state in forming the matrices $\underline{F}_5$ and $\underline{F}_4$, thus $$\underline{F}_5 = [\underline{f}_5(S1) \mid \underline{f}_5(S2) \mid \underline{f}_5(CP)] = \quad (56)$$
$$\underline{A}\,[\underline{f}_4(S1) \mid \underline{f}_4(S2) \mid \underline{f}_4(CP)] = \underline{A}\,\underline{F}_4$$

The vectors $\underline{f}_4(S1)$ and $\underline{f}_4(S2)$, and hence $\underline{f}_4(CP)$ can be calculated from the estimated position. The vector $\underline{f}_5(CP)$ can be calculated from the two sensor output vectors. The estimated orientation matrix $\hat{\underline{A}}$ can then be determined from:

$$\hat{\underline{A}} = \underline{F}_5\,\underline{F}_4^{-1} \quad (57)$$

Orientation angles are then determined as discussed previously. For computational convenience, it may be desirable to multiply $\underline{f}_5(S1)$, $\underline{f}_5(S2)$, $\underline{f}_4(S1)$, and $\underline{f}_4(S2)$ by $\hat{\rho}/C$ before computing the cross products; this results in cross-product vectors and sensor output vectors having roughly the same magnitude.

Matrix inversion can be avoided by an alternative method of determining orientation. Linear combinations of the two field vectors at the sensor location form two orthogonal synthetic field vectors; application of the same coefficients to the two sensor output vectors produces the analogous synthetic response vectors.

The two synthetic sensor response vectors are placed in the second and third columns of a matrix $\underline{A}'$, and orientation angles $\psi'$, $\theta'$, and $\phi'$ are determined from those two columns. Those orientation angles are defined in the same manner as are $\psi$, $\theta$, and $\phi$, but are referenced to the Y'-Z' coordinate frame formed by the two synthetic field vectors. The orientation $(\alpha', \beta', \theta')$ of the Y'-Z axes with respect to the $X_1$-$Y_1$-$Z_1$ axes is then determined by multiplying direction cosine vectors. The matrix $\underline{A}$ whose orientation angles are reference to the $X_1$-$Y_1$-$Z_1$ coordinate frame is then:

$$\underline{A} = \underline{T}_{\phi'}\underline{T}_{\phi'}\underline{T}_{\psi'}\underline{T}_{\gamma'}\underline{T}_{\beta'}\underline{T}_{\alpha'} \quad (58)$$

This method may allow a reduction of computation time in some applications.

If the sensor lies in the $X_1$-$Y_1$ plane, two sensor outputs will be colinear, and orientation cannot be determined from $\underline{f}_5(S1)$ and $\underline{f}_5(S2)$ alone. This suggests that for the most general allowable orientations, three-state operation should be used so that there will always be some basis against which orientation can be determined.

In far-field operation, the cross-product of any two field vectors at the sensor location is oriented radially away from the source, see Equations (35), (36), and (37). Transmission of such a vector is physically impossible, hence the cross-product is not a direct substitute for the third-axis (S3) excitation.

The cross-product is nonetheless useful in determining large-angle orientation for far-field operation. Linear combinations of the two real sensor responses and their cross product can produce synthetic responses to non-physically realizable source-frame $Y_1$- and $Z_1$-oriented fields. The synthetic responses $g_5(S2)$ and $g_5(S3)$ thus determined then yield source-frame orientation angles when used in the large-angle orientation algorithms. The coefficients required to implement the two linear transformations are elements of the inverse of a matrix composed of the two computed field vectors $[\underline{f}_4(S1)$ and $\underline{f}_4(S2)]$ and their cross product $\underline{f}_4(CP)$.

It should be noted that the equations which have been derived in the present disclosure are based upon electromagnetic fields generated by electrically short ($0.1\lambda$ or shorter) dipoles. Longer dipoles and arrays have different field patterns that will make these equations invalid. If such antennas are to be used, appropriate equations should be derived.

POSITION OF SOURCE OF UNKNOWN ORIENTATION

Three-axis reception of the signals from a multi-axis source provides information adequate to determine the position angles of the source relative to the sensor, even when the source orientation is unknown or the source structure is unknown. Note that this method of determining the direction of arrival of a signal differs from that used by ordinary direction finding, which rotates an antenna until a null in the antenna pattern is aligned with the direction of arrival, thus nulling the received signal.

Examination of the above field-coupling equations shows that the sensor output vector $\underline{f}_5$ is related to the position-frame source-excitation vector $\underline{f}_2$ by $$\underline{f}_5 = \frac{C}{\rho}\,\underline{T}_A\,\underline{T}_P^{-1}\,\underline{S}\,\underline{f}_2 \quad (59)$$

where $$\underset{\sim}{S} = \begin{bmatrix} 0 & 0 & 0 \\ 0 & 1 & 0 \\ 0 & 0 & 1 \end{bmatrix} \quad (60)$$

and $$\underset{\sim}{T}_P{}^{-1} = \underset{\sim}{T}_{-\alpha} \underset{\sim}{T}_{-\beta} \quad (61)$$

and $$\underset{\sim}{T}_A = \underset{\sim}{T}_\phi \underset{\sim}{T}_\theta \underset{\sim}{T}_\psi \quad (62)$$

note that the above position $(\alpha, \beta)$ and orientation angles $(\psi, \theta, \phi)$ are referenced to the source coordinate frame.

Figure 9:
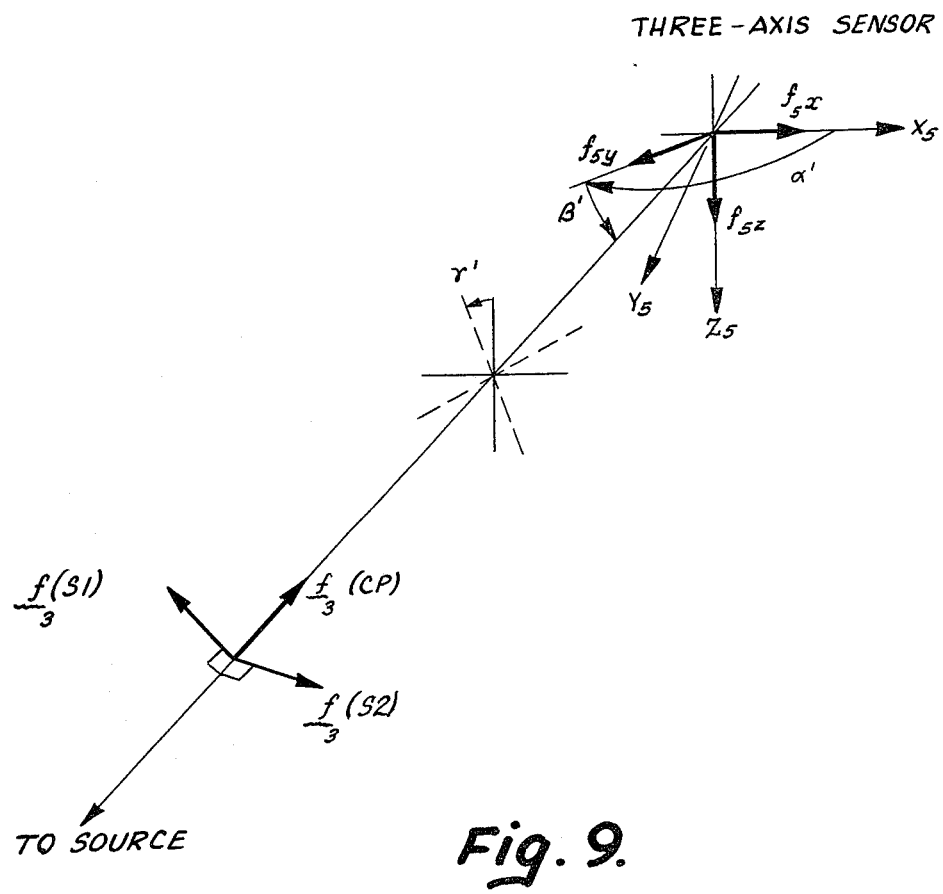
FIG. 9 is a graphical representation of the far-field electromagnetic coupling of a three axis sensor with a three axis source of unknown orientation and structure.

Since both $\underset{\sim}{T}_A$ and $\underset{\sim}{T}_P{}^{-1}$ are composed entirely of orthogonal rotations, their product can be reduced to a product of no more than three simple rotation matrices. Since the location of the source 98 with regard to the sensor coordinate frame is desired, it is convenient to use the sensor-frame position angles $\alpha'$ and $\beta'$ and a roll rotation by $\gamma'$, which are shown in FIG. 9. Equation 59 then becomes $$\underset{\sim}{f}_5 = \frac{C}{\rho} \underset{\sim}{T}_{-\alpha'} \underset{\sim}{T}_{-\beta'} \underset{\sim}{T}_{-\gamma'} \underset{\sim}{f}_3 = \frac{C}{\rho} \underset{\sim}{T}_{-\alpha'} \underset{\sim}{T}_{-\beta'} \underset{\sim}{T}_{-\gamma'} \underset{\sim}{S} \underset{\sim}{f}_2 \quad (63)$$

Now consider the characteristics of a sensor position-frame vector $\underset{\sim}{f}_3$ and the cross product $\underset{\sim}{f}_3(CP)$ of two sensor position-frame vectors. From Equation (60), $$\underset{\sim}{f}_3 = \underset{\sim}{S} \underset{\sim}{f}_2 = \begin{bmatrix} 0 \\ f_{2y} \\ f_{2z} \end{bmatrix} \quad (64)$$

since $f_{3x} = 0$, it is apparent that $\underset{\sim}{f}_3$ is orthogonal to the line connecting source 98 and the sensor 100. Furthermore, $$\underset{\sim}{f}_3(CP) = \underset{\sim}{f}_3(S1) \times \underset{\sim}{f}_3(S2) = \quad (65)$$

$$\begin{bmatrix} f_{2y}(S1) f_{2z}(S2) - f_{2y}(S2) f_{2z}(S1) \\ 0 \\ 0 \end{bmatrix}$$

Unless $f_{3x}(CP) = 0$ (which occurs only when $\underset{\sim}{f}_3(S1)$ and $\underset{\sim}{f}_3(S2)$ are colinear), $\underset{\sim}{f}_3(CP)$ is aligned with (parallel to) the line connecting the source 98 and sensor 100. Note that it may be directed either toward the source 98 or toward the sensor 100.

Since orthogonal rotations preserve the angles between vectors, as well as vector length, the cross product $\underset{\sim}{f}_5(CP)$ of two sensor output vectors is easily related to the cross product of the two sensor position-frame output vectors:

$$\underset{\sim}{f}_5(CP) = \underset{\sim}{f}_5(S1) \times \underset{\sim}{f}_5(S2) \quad (66)$$

$$= \frac{C^2}{\rho^2} \underset{\sim}{T}_{-\alpha'} \underset{\sim}{T}_{-\beta'} \underset{\sim}{T}_{-\gamma'} \underset{\sim}{f}_3(CP)$$

Since a roll rotation has no effect on the X-element in a vector, and $f_{3y}(CP) = f_{3z}(CP) = 0$, $\underset{\sim}{f}_3(CP)$ is invariant under $\underset{\sim}{T}_{-\gamma'}$ and $$\underset{\sim}{f}_5(CP) = \frac{C^2}{\rho^2} \underset{\sim}{T}_{-\alpha'} \underset{\sim}{T}_{-\beta'} \underset{\sim}{f}_3(CP) \quad (67)$$

Carrying out the matrix multiplications in (66) produces:

$$\underset{\sim}{T}_{-\alpha'} \underset{\sim}{T}_{-\beta'} = \begin{bmatrix} \cos\alpha' \cos\beta' & -\sin\alpha' & \cos\alpha' \sin\beta' \\ \sin\alpha' \cos\beta' & \cos\alpha' & \sin\alpha' \sin\beta' \\ -\sin\beta' & 0 & \cos\beta' \end{bmatrix} \quad (68)$$

and $$\underset{\sim}{f}_5(CP) = \frac{C^2 f_{3x}(CP)}{\rho^2} \begin{bmatrix} \cos\alpha' \cos\beta' \\ \sin\alpha' \cos\beta' \\ -\sin\beta' \end{bmatrix} = \quad (69)$$

$$\frac{C^2}{\rho^2} \begin{bmatrix} f_{5x}(CP) \\ f_{5y}(CP) \\ f_{5z}(CP) \end{bmatrix}$$

The unknown angles $\alpha'$ and $\beta'$ can then be determined from $\underset{\sim}{f}_5(CP)$ in several ways; for example, $$\hat{\alpha}' = \arctan\left[\frac{f_{5y}(CP)}{f_{5x}(CP)}\right] \quad (70)$$

$$\hat{\beta}' = \arctan\left[\frac{-f_{5z}(CP)}{f_{5y}(CP)/\sin\alpha'}\right] \quad (71)$$

If C and $f_{3x}(CP)$ are known, the unknown distance $\hat{\rho}$ can be determined. Alternatively, if the source 98 has three orthogonal axes, Equation (17) can be used to determine $\hat{\rho}$. Remember that $\underset{\sim}{f}_5(CP)$ is determined entirely from measured sensor output vectors with no a priori information about the source 98.

SIGNAL FORMATS

The signal format used by the transmitter must be designed to allow the user to determine his position and orientation. The geometric computations discussed in the previous section establish some informational parameters which are advantageously met by the format. First, it must allow airborne components 20 to determine the amplitude of the signal induced in a given receiving antenna (22, 23 or 24) by each transmitting antenna (41, 42 or 43). Secondly, it advantageously provides one-way data transmission capability so airborne components 20 will know the power, (i.e. strengths), of the transmitted signal. Thirdly, to facilitate communication of both of the previous information parameters, the signal may include a timing reference, and all signal components should advantageously be coherent with this reference. The timing signal is used to characterize the polarity of the transmitted signal. If this timing signal is omitted, there is an increase in the ambiguity as to position and orientation of the remote object. Of course, independent information sources may be used to remove this ambiguity. For example, navigation aids may be used to determine the quadrant (i.e. northeast, southeast, northwest or southwest) of the remote object with respect to the radiating means; altimeters may be used to determine the relative height of the remote object with respect to the radiating means, which may be located at the top of the hill.

There are endless varieties of formats which can meet the above requirements. However, it is additionally desirable that the signal format allow easy acquisition by the user as he approaches the landing point. Simplicity in the receiver is also quite desirable. Four possibilities for transmitted signal format are:

1. FREQUENCY DIVISION MULTIPLEXING (FDM)

In this format, each transmitting antenna in the array is assigned a particular, different frequency. Measurements of the information parameters can be simply the outputs of integrators corresponding to the three frequencies. The carriers are of constant phase and therefore easily acquired by a phase-locked loop with an appropriate time constant.

2. TIME DIVISION MULTIPLEXING (TDM)

In TDM, only one dipole of the ground antenna array is excited at a time. Simplification of transmitter and receiver is possible because circuits can be time-shared. However, data transmission is more complex, and moving aircraft must interpolate between measurements to provide the equivalent of simultaneous measurements. This is an advantageous mode of multiplexing for the location of a relatively slow moving or trapped miner below ground.

3. PHASE DIVISION MULTIPLEXING (nutation)

Proper excitation of the three dipoles will produce the equivalent of physical nutation of a single dipole antenna. This may be accomplished by excitation of the Z dipole with an unmodulated carrier and the X and Y dipoles by carriers with high frequency amplitude modulation by sine and cosine waves, respectively. While this results in a beacon-like signal, that property is not actually utilized in the position and orientation calculations. What is utilized is that the radiated electromagnetic field from each of the ground dipole antennas can be identified by either an unmodulated carrier or a phase difference between the modulation envelope of two modulated carriers. If a nutating field is used there is no requirement that the axis of nutation be positioned along a line between the radiating and the receiving antennas. The position and orientation of the remote object can be determined regardless of the orientation of the axis of nutation.

4. SPREAD SPECTRUM MULTIPLEXING

To accomplish spread spectrum multiplexing, each transmitted signal is assigned a unique code sequence which shifts carrier frequency, carrier phase (or both). Reception is accomplished by using identical code sequences to remove the modulation. The codes assigned to the three antennas are designed not to cross correlate and thus make possible measurement of individual signals. However, acquisition is typically more difficult, both because of the absence of a carrier component and because the code timing must be acquired, in addition to the carrier.

The selection of carrier frequency, spread-spectrum chipping rate, data frequency, transmitter power, antenna size, and other parameters is naturally dependent upon this application. Carrier frequencies in the 200 to 3000 MHz range will generally be found suitable. For these carrier frequencies, chipping rates of 100 kHz to 10 MHz are practical. Consequently, data frequencies of 10 kb/s to 1 Mb/s are possible. If frequency-division multiplex is used, carrier frequencies should be separated by 10 kHz to 100 kHz to allow for Doppler shifts.

While the present invention has been described in terms of a long distance landing aid system, it can also be useful in applications such as airdrop guidance and control, collision avoidance, target handoff, and refueling and station keeping.

Various modifications and variations will no doubt occur to those skilled in the various arts to which this invention pertains. As discussed above, the signal format may be chosen from any of numerous alternatives. Additionally, the particular parameters of the transmitting and receiving apparatus will depend upon the particular application. Systems for either longer or shorter ranges can be designed by appropriate choices of parameters. These and all other variations which rely basically on the teachings through which this disclosure has advanced the art are properly considered within the scope of this invention as defined by the appended claims.

The embodiments of the invention in which an exclusive property or privilege is claimed are defined as follows:

1. Apparatus for determining the position of a source of electromagnetic radiation relative to a remote object and the orientation of the remote object relative to the position of the source comprising:

a multicomponent radiating means of unknown orientation and structure identifying the origin of said source;

transmitter means for applying to said multicomponent radiating means electrical signals which generate a plurality of electromagnetic fields, said plurality of electromagnetic fields being distinguishable from one another;

a plurality of receiving means disposed on said remote object, said receiving means having at least three orthogonal components for detecting and measuring components of said electromagnetic fields;

said radiating means and said receiving means being adapted for operation at a separation distance sufficient to insure that the far-field components of said electromagnetic fields are substantially greater in magnitude than the near-field components of said electromagnetic fields; and analyzing means associated with said receiving means for converting the components of said electromagnetic fields received by said plurality of receiving means into source position relative to said remote object without a priori knowledge of the orientation of said source or the relative orientation of its components with at least one ambiguous combination of orientation or position, said analyzing means comprising means for operating open loop with respect to said radiating means.

2. Apparatus as recited in claim 1 wherein said transmitting means comprises at least two orthogonal components.

3. Apparatus as recited in claim 2 wherein said analyzing means comprises means for converting, in a non-iterative manner, the components of said electromagnetic fields received by said receiving means into remote object position and orientation relative to said source.

4. Apparatus as recited in claim 1 wherein said transmitting means comprises three orthogonal components.

5. Apparatus as recited in claim 1 wherein said transmitter means comprises means for multiplexing, said means for multiplexing being selected from a group of circuits including circuits for time, frequency, phase and spread spectrum multiplexing of said electrical signals.

6. Apparatus as recited in claim 1 wherein said analyzing means is physically remote from said receiving means and said analyzing means and said receiving means are coupled by electromagnetic radiation.

7. Apparatus as recited in claim 1 wherein each of said radiating means comprises an electric dipole source.

8. Apparatus as recited in claim 1 wherein said transmitter means comprises means for generating electrical signals containing information selected from the group of transmitter identification, electromagnetic field distortion corrections, locations of obstacles, location of a landing site relative to said radiating means and wind direction.

9. Apparatus as recited in claim 1 comprising a monitor station at a fixed location spaced from said radiating means having receiving means for detecting said radiated electromagnetic fields and being coupled to said transmitting means for providing feedback to said transmitting means representative of said transmitted fields.

* * * * *

UNITED STATES PATENT AND TRADEMARK OFFICE
CERTIFICATE OF CORRECTION

PATENT NO. : 4,328,548
DATED : May 4, 1982
INVENTOR(S) : Crow et al.

It is certified that error appears in the above—identified patent and that said Letters Patent is hereby corrected as shown below:

In Abstract, lines 8 and 9:

"multiplied" should be --multiplexed--

In Abstract, line 24:

"a priori" should be --*a priori*--

In Abstract, line 28:

"position orientation" should be --position and orientation--

Column 2, line 39:

"assignee" (first occurrence) should be --assigned--

UNITED STATES PATENT AND TRADEMARK OFFICE
CERTIFICATE OF CORRECTION

PATENT NO. : 4,328,548
DATED : May 4, 1982
INVENTOR(S) : Crow et al.

It is certified that error appears in the above—identified patent and that said Letters Patent is hereby corrected as shown below:

Column 3, line 24:

"established" should be --establishes--

Column 3, line 44:

"distinguished" should be --distinguishable--

Column 3, line 63:

"a priori" should be --*a priori*--

Column 4, line 9:

"a electric" should be --an electric--

Column 5, line 40:

"30" should be --20-- (first occurrence)

Column 11, line 33:

"$E_t=(Il\pi/\lambda^2\rho)\sin\delta$" should be --$E_t = \frac{I\ell\pi}{\lambda^2\rho}\sin\delta$--

Column 11, line 35:

"1" should be --$\ell$--

Column 11, line 44:

"$|H|=(|E|/\eta)$" should be --$|H| = \frac{|E|}{\eta}$--

UNITED STATES PATENT AND TRADEMARK OFFICE
CERTIFICATE OF CORRECTION

PATENT NO. : 4,328,548

DATED : May 4, 1982

INVENTOR(S) : Crow et al.

It is certified that error appears in the above—identified patent and that said Letters Patent is hereby corrected as shown below:

Column 13, line 46:

"$f_3$" should be --$\underset{\sim}{f}_3$--

Column 13, line 47:

"(C/p)" should be --(C/ρ)--

Column 14, line 46:

"$\underset{\sim}{f}_3(S1)$" should be --$\underset{\sim}{f}_3(S3)$--

Column 16, table 3, quadrant 8:

"0°...90°    0°...-90°" should be

--0°...-90°    0°...-90°--

Column 17, line 22:

"P(S1 > P(S2)" should be --P(S1) > P(S2)--

Column 19, line 39:

"A," should be --$\underset{\sim}{A}$,--

UNITED STATES PATENT AND TRADEMARK OFFICE
CERTIFICATE OF CORRECTION

PATENT NO. : 4,328,548

DATED : May 4, 1982

INVENTOR(S) : Crow et al.

It is certified that error appears in the above—identified patent and that said Letters Patent is hereby corrected as shown below:

Column 21, line 28:

"A" should be --$\hat{A}$--

Signed and Sealed this

Twenty-eighth Day of June 1983

[SEAL]

Attest:

Attesting Officer

GERALD J. MOSSINGHOFF

Commissioner of Patents and Trademarks